United States Patent
Son

(10) Patent No.: US 9,681,112 B2
(45) Date of Patent: Jun. 13, 2017

(54) IMAGE DISPLAY APPARATUS AND METHOD FOR CONTROLLING THE IMAGE DISPLAY APPARATUS

(75) Inventor: Kwon Sung Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1027 days.

(21) Appl. No.: 12/904,869

(22) Filed: Oct. 14, 2010

(65) Prior Publication Data

US 2011/0102321 A1 May 5, 2011

Related U.S. Application Data

(60) Provisional application No. 61/258,215, filed on Nov. 5, 2009.

(51) Int. Cl.
| | |
|---|---|
| G06F 5/00 | (2006.01) |
| H04N 13/00 | (2006.01) |
| G06F 3/0346 | (2013.01) |
| G06F 3/0481 | (2013.01) |
| H04N 13/04 | (2006.01) |
| H04N 21/422 | (2011.01) |

(52) U.S. Cl.
CPC ....... *H04N 13/0003* (2013.01); *G06F 3/0346* (2013.01); *G06F 3/04815* (2013.01); *H04N 13/0497* (2013.01); *H04N 21/42222* (2013.01)

(58) Field of Classification Search
CPC ........... H04N 13/0003; H04N 13/0497; H04N 21/42222; G06F 3/04815; G06F 3/0346
USPC ................................ 345/102, 156, 419, 427
See application file for complete search history.

(56) References Cited

U.S. PATENT DOCUMENTS

| | | | | |
|---|---|---|---|---|
| 6,225,979 | B1* | 5/2001 | Taima et al. | 345/157 |
| 6,918,087 | B1* | 7/2005 | Gantt | 715/737 |
| 2005/0128211 | A1* | 6/2005 | Berger et al. | 345/582 |
| 2008/0225007 | A1* | 9/2008 | Nakadaira | G06F 3/04815 345/173 |
| 2009/0007203 | A1* | 1/2009 | Drazin et al. | 725/106 |
| 2009/0290072 | A1* | 11/2009 | Lee | 348/734 |
| 2010/0002026 | A1* | 1/2010 | Seetzen et al. | 345/690 |
| 2011/0227825 | A1* | 9/2011 | Liberty et al. | 345/158 |

FOREIGN PATENT DOCUMENTS

| | | |
|---|---|---|
| EP | 0285315 A2 | 10/1988 |
| EP | 1821182 A1 | 8/2007 |
| EP | 1954036 A2 | 8/2008 |

* cited by examiner

*Primary Examiner* — Jonathan Boyd
(74) *Attorney, Agent, or Firm* — Birch, Stewart, Kolasch & Birch, LLP

(57) ABSTRACT

An image display apparatus including a remote control interface configured to receive a signal from a remote controller; a controller configured to calculate a first pointer position at which a pointer is to be displayed on a display of the image display apparatus based on the received signal, to determine a depth of a three-dimensional (3D) object displayed on the display of the image display apparatus, and to calculate a second position of the pointer based on the determined depth of the 3D object; and a video processor configured to display the pointer at the calculated second pointer position on the display of the image display apparatus.

9 Claims, 23 Drawing Sheets

| | SHIFT VALUE | 0~10 | 10~20 | 20~30 | 30~40 | 40~50 | 50 above |
|---|---|---|---|---|---|---|---|
| RIGHT→LEFT | DEPTH LEVEL | 0 | 1 | 2 | 3 | 4 | 5 |
| LEFT→RIGHT | SHIFT VALUE | 0~10 | 10~20 | 20~30 | 30~40 | 40~50 | 50 above |
| | DEPTH LEVEL | 0 | -1 | -2 | -3 | -4 | -5 |

IMAGE DISPLAY APPARATUS AND METHOD FOR CONTROLLING THE IMAGE DISPLAY APPARATUS

CROSS-REFERENCE TO A RELATED APPLICATION

This application claims the priority benefit of U.S. Provisional Patent Application No. 61/258,215, filed on Nov. 5, 2009, the disclosure of which is incorporated herein by reference in its entirety.

BACKGROUND OF THE INVENTION

1. Field of the Invention

The present invention relates to an image display apparatus and corresponding method for displaying a three-dimensional (3D) object and a pointer at a same depth level.

2. Background of the Invention

An image display apparatus can display a broadcast program selected by the user on a display from among broadcast programs transmitted from broadcasting stations. A recent trend in broadcasting is a worldwide shift from analog broadcasting to digital broadcasting. Further, digital broadcasting offers many advantages over analog broadcasting such as a robustness against noise, less data loss, easier error correction, and the ability to provide high-definition clear images. Digital broadcasting also includes user-interactive services.

However, as the broadcast channels increase in number to meet various user demands, the user has to choose among many channels to select an intended channel. This is often time consuming and tedious for the user. The display apparatus also takes time to switch to and display the selected channel.

The remote controller provided with display apparatuses also include a plethora of buttons that the user can select to perform different functions on the display apparatus or other devices connected with the display apparatus. The remote controller also allows the user to select options on the display via a pointer. However, visually seeing the pointer on the display is difficult, especially with advancing screen displays.

SUMMARY OF THE INVENTION

Accordingly, an object of the present invention is to address the above-noted and other problems.

Another object of the present invention is to provide a novel image display apparatus and corresponding control method in which a pointer is displayed at a same depth as a 3D object on a display of the image display apparatus.

To achieve these and other advantages and in accordance with the purpose of the present invention, as embodied and broadly described herein, the present invention provides in one aspect a method for controlling an image display apparatus, and which includes receiving, via a remote control interface, a signal from a remote controller; calculating, via a controller, a first pointer position at which a pointer is to be displayed on a display of the image display apparatus based on the received signal; determining, via the controller, a depth of a three-dimensional (3D) object displayed on the display of the image display apparatus; calculating, via the controller, a second position of the pointer based on the determined depth of the 3D object; and displaying, via a video processor, the pointer at the calculated second pointer position.

In another aspect, the present invention provides an image display apparatus including a remote control interface configured to receive a signal from a remote controller; a controller configured to calculate a first pointer position at which a pointer is to be displayed on a display of the image display apparatus based on the received signal, to determine a depth of a three-dimensional (3D) object displayed on the display of the image display apparatus, and to calculate a second position of the pointer based on the determined depth of the 3D object; and a video processor configured to display the pointer at the calculated second pointer position on the display of the image display apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 8A to 12 are overviews referred to for describing the image display apparatus illustrated in FIGS. 3 and 4;

DETAILED DESCRIPTION

Exemplary embodiments of the present invention will be described below with reference to the attached drawings.

An image display apparatus may be controlled by a signal or signals transmitted by a remote controller. Thus, a user can enter commands such as a power on/off command, a channel up/down command, a volume up/down command, etc. to the image display apparatus using the remote controller. The remote controller also transmits a signal carrying a command corresponding to a user manipulation to the image display apparatus, and the image display apparatus performs an operation corresponding to the command included in the received signal.

The remote controller can also transmit signals to the image display apparatus in compliance with an InfraRed (IR) communication standard and other radio communication standards. A remote controller can also be configured to sense a user motion and transmit a signal carrying a command corresponding to the user motion to the image display apparatus, which will be referred to as a spatial remote controller.

Figure 1A:
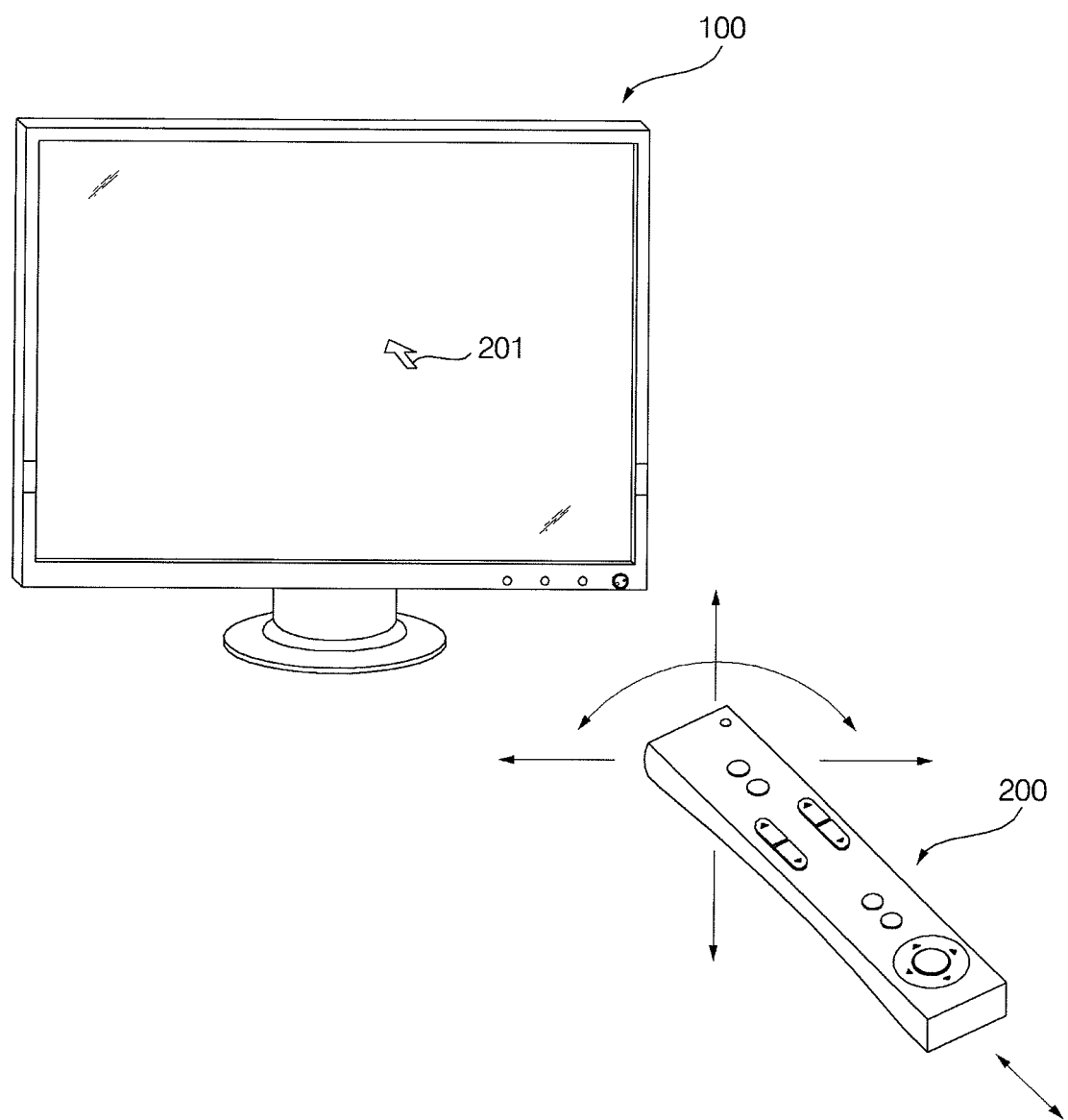
FIGS. 1A and 1B are perspective views illustrating an image display apparatus and a spatial remote controller according to an embodiment of the present invention.
Figure 1B:
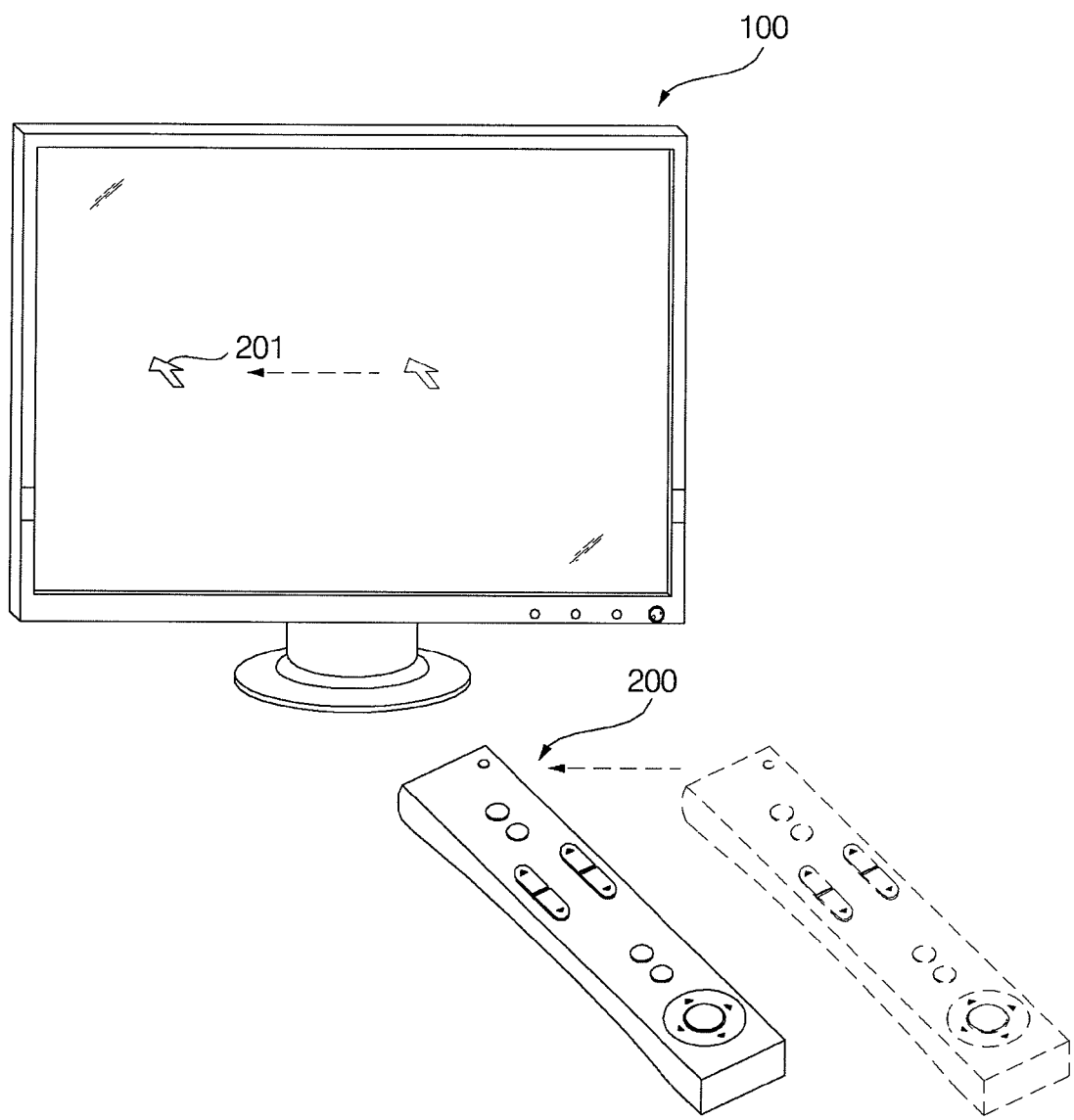

For example, FIGS. 1A and 1B are perspective views illustrating an image display apparatus 100 and a spatial remote controller 200 for transmitting a command to the image display apparatus 100 according to an embodiment of the present invention. Referring to FIGS. 1A and 1B, in operation, the spatial remote controller 200 transmits or receives Radio Frequency (RF) signals to or from the image display apparatus 100 according to an RF communication standard. As illustrated in FIG. 1A, a pointer 201 representing the movement of the spatial remote controller 200 can be displayed on the image display apparatus 100.

Further, a user can move the spatial remote controller 200 up and down, back and forth, and side to side, or rotate the spatial remote controller 200. The pointer 201 then moves on the image display apparatus 100 according to the movement of the spatial remote controller 200, as illustrated in FIG. 1B. In more detail and referring to FIG. 1B, if the user moves the spatial remote controller 200 to the left, the pointer 201 moves to the left.

In addition, the spatial remote controller 200 includes a sensor capable of detecting motions and thus detects the movement of the spatial remote controller 200 and transmits motion information corresponding to the detection result to the image display apparatus 100. Then, the image display apparatus 100 determines the movement of the spatial remote controller 200 based on the motion information received from the spatial remote controller 200 and calculates the coordinates of a target point to which the pointer 201 should be shifted in accordance with the movement of spatial remote controller 200 based on the result of the determination. Then, the image display apparatus 100 displays the pointer 201 at the calculated coordinates.

As illustrated in FIGS. 1A and 1B, the pointer 200 can move on the image display apparatus 100 according to a vertical movement, a horizontal movement, or a rotation of the spatial remote controller 200. The moving speed and direction of the pointer 201 can also correspond to the moving speed and direction of the spatial remote controller 200. Alternatively, an operation command can be input to the image display apparatus 100 in response to the movement of the spatial remote controller 200. For example, as a user moves the spatial remote controller 200 back and forth, an image displayed on the image display apparatus 100 can be gradually enlarged or reduced.

Figure 2:
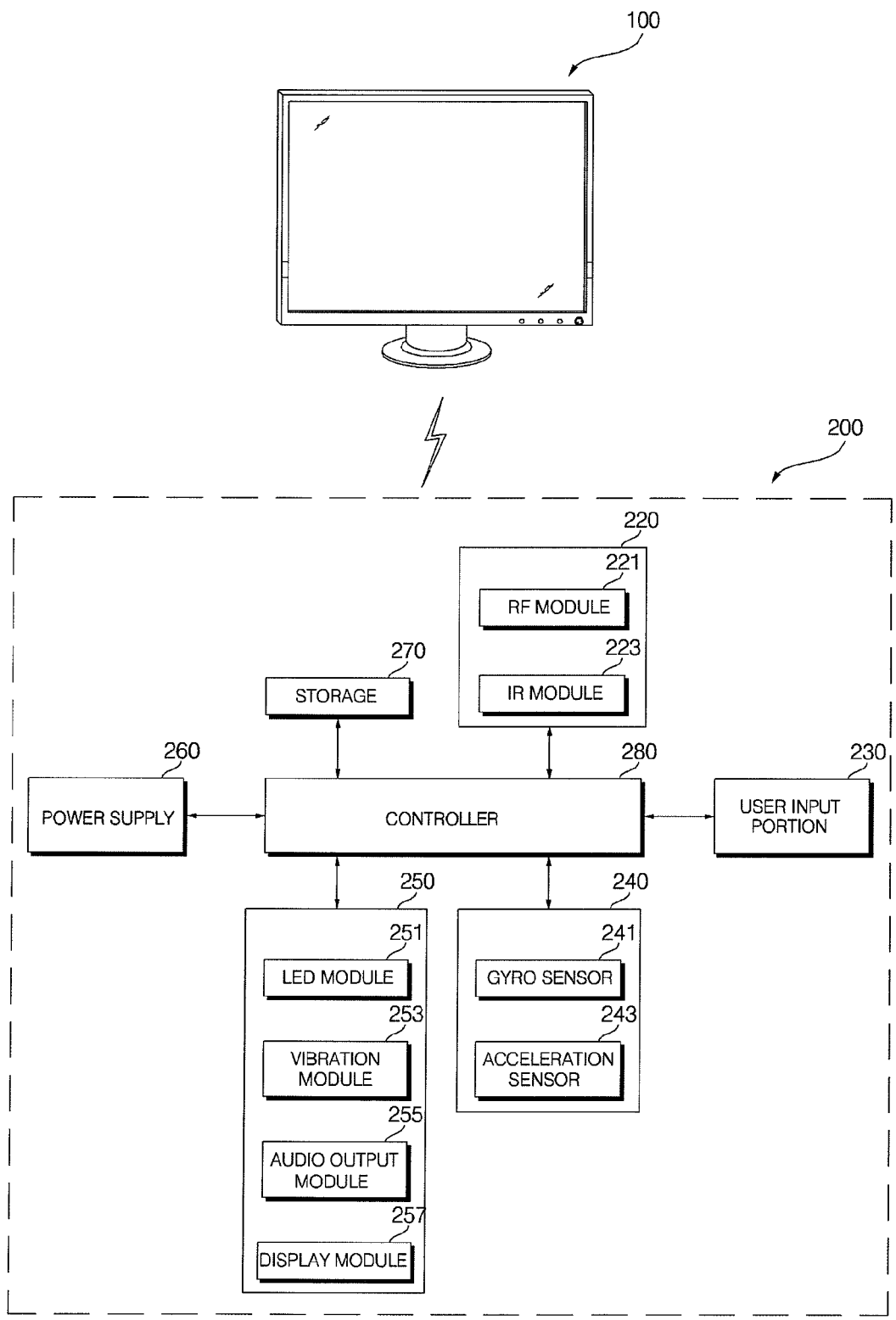
FIG. 2 is a block diagram of the spatial remote controller according to an embodiment of the present invention.

Next, FIG. 2 is a block diagram of the spatial remote controller 200 illustrated in FIGS. 1A and 1B. Referring to FIG. 2, the spatial remote controller 200 includes a wireless communication module 220, a user input portion 230, a sensor portion 240, an output portion 250, a power supply 260, a storage 270, and a controller 280. The wireless communication module 220 can transmit signals to and/or receive signals from the image display apparatus 100 and includes an RF module 221 for transmitting RF signals to and/or receiving RF signals from the image display apparatus 100 according to an RF communication standard.

Further, the wireless communication module 220 also includes an IR module 223 for transmitting IR signals to and/or receiving IR signals from the image display apparatus 100 according to an IR communication standard. The spatial remote controller 200 also transmits a signal carrying motion information regarding the movement of the spatial remote controller 200 to the image display apparatus 100 through the RF module 221 in this embodiment. The spatial remote controller 200 can also receive signals from the image display apparatus 100 through the RF module 221, and transmit commands to the image display apparatus 100 through the IR module 223, when needed, such as a power on/off command, a channel switching command, or a sound volume change command.

The user input portion 230 also includes, for example, a keypad and/or a plurality of buttons. The user can then enter commands to control the image display apparatus 100 by manipulating the user input portion 230. If the user input portion 230 includes a plurality of hard-key buttons, the user can input various commands to control the image display apparatus 100 by pressing the hard-key buttons. Alternatively or additionally, if the user input portion 230 includes a touch screen displaying a plurality of soft keys, the user can input various commands to the image display apparatus 100 by touching the soft keys. The user input portion 230 may also include various input tools other than those set forth herein, such as a scroll key and/or a jog key, etc.

Further, the sensor portion 240 in FIG. 2 includes a gyro sensor 241 and/or an acceleration sensor 243. The gyro sensor 241 can sense the movement of the spatial remote controller 200, for example, in X-, Y-, and Z-axis directions, and the acceleration sensor 243 can sense the moving speed of the spatial remote controller 200. In addition, the output portion 250 can output video and/or audio signals corresponding to a manipulation of the user input portion 230 or a signal transmitted by the image display apparatus 100. The user can also easily identify whether the user input portion 230 has been manipulated or whether the image display apparatus 100 has been controlled based on the video and/or audio signals output by the output portion 250.

For example, the output portion 250 includes a Light Emitting Diode (LED) module 251 which is turned on or off whenever the user input portion 230 is manipulated or whenever a signal is received from or transmitted to the image display apparatus 100 through the wireless communication module 220, a vibration module 253 which generates vibrations, an audio output module 255 which outputs sound, and/or a display module 257 which outputs an image.

In addition, the power supply 260 supplies power to the spatial remote controller 200, and if the spatial remote controller 200 is kept stationary for a predetermined time or longer, the power supply 260 may, for example, reduce or cut off supply of power to the spatial remote controller 200 in order to save power. The power supply 260 can then resume the power supply if a specific key on the spatial remote controller 200 is manipulated, for example.

Further, the storage 270 stores various programs and application data for controlling or driving the spatial remote controller 200. Also, the spatial remote controller 200 can wirelessly transmit signals to and/or receive signals from the image display apparatus 100 in a predetermined frequency band with the aid of the RF module 221. Thus, the controller 280 of the spatial remote controller 200 can store information regarding the frequency band used for the spatial remote controller 200 to wirelessly transmit signals to and/or wirelessly receive signals from the paired image display apparatus 100 in the storage 270 and then refer to this information for a later use.

In addition, the controller 280 provides overall control to the spatial remote controller 200. For example, the controller 280 can transmit a signal corresponding to a key manipulation detected from the user input portion 230 or a signal corresponding to a motion of the spatial remote controller 200 sensed by the sensor portion 240, to the image display apparatus 100 through the wireless communication module 220.

Figure 3:
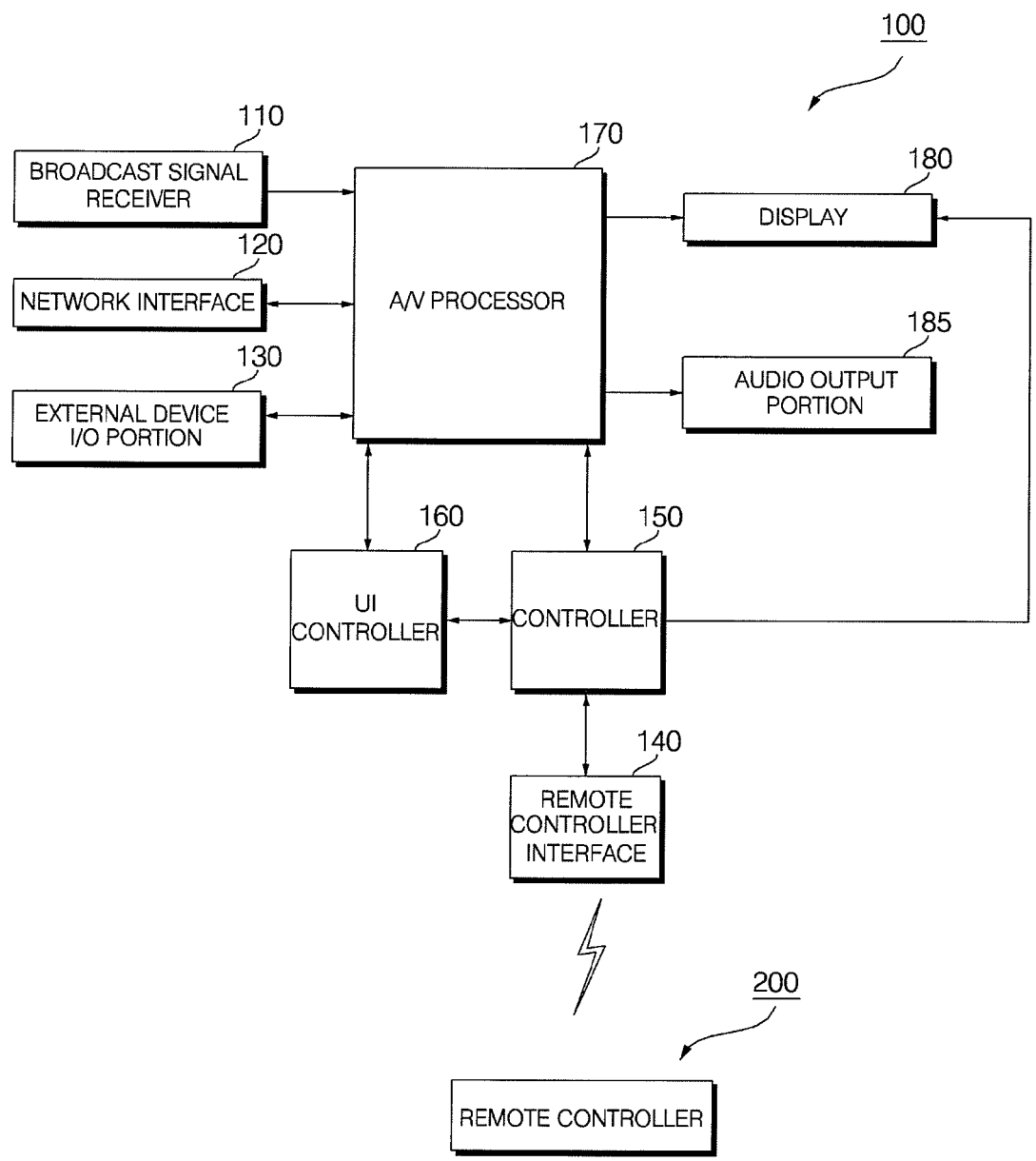
FIGS. 3 and 4 are block diagrams of an image display apparatus according to an embodiment of the present invention.

Next, FIG. 3 is a block diagram of the image display apparatus 100 according to an embodiment of the present invention. Referring to FIG. 3, the image display apparatus 100 includes a broadcast signal receiver 110, a network interface 120, an external device Input/Output (I/O) portion 130, a remote controller interface 140, a controller 150, a User Interface (UI) controller 160, an Audio/Video (I/O) processor 170, a display 180, and an audio output portion 185.

The broadcast signal receiver 110 can receive an RF broadcast signal corresponding to a channel selected by the user or an RF broadcast signal corresponding to all preliminarily memorized channels among a plurality of RF broadcast signals received through an antenna, downconvert the received RF broadcast signal to a digital Intermediate Frequency (IF) signal or an analog baseband A/V signal, and output the digital IF signal or the analog baseband A/V signal to the A/V processor 170. The broadcast signal receiver 110 can also receive RF broadcast signals from an Advanced Television Systems Committee (ATSC) single-carrier system or from a Digital Video Broadcasting (DVB) multi-carrier system.

Further, the broadcast signal receiver 110 can sequentially or periodically select a number of RF broadcast signals corresponding to a number of preliminarily memorized broadcast channels by a channel-add function from among a plurality of RF signals received through the antenna and downconvert the selected RF broadcast signals to IF signals or baseband A/V signals. This operation can be performed to display a thumbnail list including a plurality of thumbnail images corresponding to the preliminarily memorized broadcast channels on the display 180. Thus, it is possible to receive the RF broadcast signal corresponding to the selected channel, or to receive the RF broadcast signals corresponding to all of the preliminarily memorized channels sequentially or periodically.

In addition, the network interface 120 interfaces the image display apparatus 100 with a wired/wireless network including the Internet, and can include a wireless communication module for connecting the image display apparatus 100 wirelessly to the Internet. For the wireless Internet access, the wireless communication module may operate based on a Wireless Local Area Network (WLAN) (i.e., Wi-Fi), Wireless Broadband (Wibro), World Interoperability for Microwave Access (WiMax), or High Speed Downlink Packet Access (HSDPA) standard. The network interface 120 can also receive contents or data from a content provider or a network operator over the network, specifically contents such as broadcasting, games, Video On Demand (VOD), broadcast signals, etc. and information related to the contents. In addition, the network interface 120 can receive firmware update information and update files from a network operator, for example.

Further, the external device I/O portion 130 can connect the image display apparatus 100 to external devices. For the connection between the image apparatus 100 and the external devices, the external device I/O portion 130 may include an A/V I/O portion or a wireless communication module. Also, the external device I/O portion 130 is connected wirelessly or wiredly to an external device such as a Digital Versatile Disc (DVD), a Bluray disc, a gaming device, a camera, a camcorder, or a computer (e.g., a laptop computer). Then, the external device I/O portion 130 externally receives video, audio, and/or data signals from the external device and transmits the received external input signals to the A/V processor 170 of the image display apparatus 100. In addition, the external device I/O portion 130 can output video, audio, and data signals processed by the A/V processor 170 to the external device.

Further, to transmit A/V signals received from the external device to the image display apparatus 100, the A/V I/O portion of the external device I/O portion 130 may include an Ethernet port, a Universal Serial Bus (USB) port, a Composite Video Banking Sync (CVBS) port, a component port, a Super-video (S-video) (analog) port, a Digital Visual Interface (DVI) port, a High Definition Multimedia Interface (HDMI) port, a Red-Green-Blue (RGB) port, and a D-sub port. The wireless communication module of the external device I/O portion 130 can also wirelessly communicate with another electronic device. For the wireless communication, the image display apparatus 100 can be connected to another electronic device by Bluetooth, Radio-Frequency IDentification (RFID), Infrared Data Association (IrDA), Ultra WideBand (UWB), or ZigBee.

Further, the external device I/O portion 130 may be connected to various set-top boxes through at least one of the Ethernet port, the USB port, the CVBS port, the component port, the S-video port, the DVI port, the HDMI port, the RGB port, and the D-sub port and may thus receive data from or transmit data to the various set-top boxes. For example, when connected to an Internet Protocol Television (IPTV) set-top box, the external device I/O portion 130 can transmit video, audio and data signals processed by the IPTV set-top box to the A/V processor 170 and transmit various signals received from the A/V processor 170 to the IPTV set-top box.

The term 'IPTV' as used herein covers a broad range of services depending on transmission networks such as Asynchronous Digital Subscriber Line-TV (ADSL-TV), Very High Speed Digital Subscriber Line-TV (VDSL-TV), Fiber To The Home-TV (FTTH-TV), TV over Digital Subscriber Line (DSL), Video over DSL, TV over IP (TVIP), Broadband TV (BTV), and Internet TV and full-browsing TV, which are capable of providing Internet-access services. The external device I/O portion 130 can also be connected to a communication network that enables voice calls or video calls. Also, the communication network may be any of a broadcasting communication network, a Public Switched Telephone Network (PSTN), and a mobile communication network.

In addition, the remote controller interface 140 includes a wireless communication module which wirelessly transmits signals to and/or wirelessly receives signals from the spatial remote controller 200, and a coordinate calculator which calculates a pair of pointer coordinates representing a target point on the display 180 to which the pointer 201 should be moved in accordance with the movement of the spatial remote controller 200. The remote controller interface 140 can also wirelessly transmit RF signals to and/or wirelessly receive RF signals from the spatial remote controller 200 through an RF module. Also, the remote controller interface 140 can wirelessly transmit IR signals to and/or wirelessly receive IR signals from the spatial remote controller 200 through an IR module.

Further, the coordinate calculator of the remote controller interface 140 can receive motion information regarding the movement of the spatial remote controller 200 from the wireless communication module of the spatial remote controller 200 and calculate a pair of (X, Y) pointer coordinates representing a target point to which the pointer 201 should be shifted on a screen of the display 180 by correcting the motion information from a user's hand shaking or other possible errors.

In addition, a signal received in the image display apparatus 100 from the spatial remote controller 200 through the remote controller interface 140 is output to the controller 150. Then, the controller 150 can acquire information regarding the movement of the spatial remote controller 200 and information regarding a key manipulation detected from the spatial remote controller 200 from the signal received from the remote controller interface 140, and control the image display apparatus 100 based on the acquired information.

Alternatively, the remote controller 200 can calculate the (X, Y) pointer coordinates corresponding to the movement of the spatial remote controller 200 and output the calculated (X, Y) pointer coordinates to the remote controller interface 140. The remote controller interface 140 can then transmit the received (X, Y) pointer coordinates to the controller 150 with or without correcting movements regarding a user's hand shaking or possible errors.

Further, the controller 150 provides overall control to the image display apparatus 100, and can receive a signal from the spatial remote controller 200 through the remote controller interface 140. Also, the controller 150 can receive a command by input of a local key provided in the image display apparatus 100. The controller 150 then identifies a command included in the received signal or a command corresponding to the local key manipulation and controls the image display apparatus 100 to operate according to the command. For example, upon receipt of a command to select a specific channel from the user, the controller 150 controls the broadcast signal receiver 110 to receive a broadcast signal on the selected channel. The controller 150 also controls the A/V processor 170 to process audio and video signals of the broadcast signal received on the selected channel and to output information about the user-selected channel along with the audio and video signals to the audio output portion 185 and the display 180, respectively.

In another example, the user may enter a command to output a different type of A/V signal to the image display apparatus 100 through the spatial remote controller 200. For example, the user may want to view a video signal received from a camera or a camcorder through the external device I/O portion 130. Then, the controller 150 controls the A/V processor 170 to output an A/V signal received through the USB port of the external device I/O portion 130 to the audio output portion 185 or the display 180.

Further, the UI controller 160 generates a Graphic UI (GUI) related to the image display apparatus 100 and outputs the GUI to the display 180 or the audio output portion 185 through the A/V processor 170. The GUI may also be changed based on a command included in a signal received from the spatial remote controller 200, a command received by input of a local key provided in the image display apparatus 100, or an operation of the image display apparatus 100.

For example, upon receipt of a signal from the spatial remote controller 200, the UI controller 160 can generate a pointer image signal corresponding to the movement of the spatial remote controller 200 and output the pointer image signal to the A/V processor 170. The controller 150 can also calculate pointer coordinates representing a target point to which the pointer 201 should be shifted according to the signal received from the spatial remote controller 200 and output information about the calculated pointer coordinates to the UI controller 160. Further, the UI controller 160 can generate the pointer image signal based on the received pointer coordinate information.

The A/V processor 170 processes the pointer image signal so that the pointer 201 is displayed on the display 180 in correspondence with the pointer image signal. The pointer 201 displayed on the display 180 also moves according to the movement of the spatial remote controller 200. In another example, the UI controller 160 can generate an image signal for a UI including an object corresponding to a command included in the signal received through the spatial remote controller 200, a command received by input of a local key, or an operation of the image display apparatus 100 and output the UI image signal to the A/V processor 170.

Objects include various types of widgets by which commands are entered to the image display apparatus 100 or information related to the image display apparatus 100 is provided to the user. The widgets can also be displayed in On Screen Display (OSD). Further, the objects include images or text that provide information about the image display apparatus 100 or an image displayed on the image display apparatus 100, such as a sound output (volume) level, channel information, current time, etc. The objects can also be implemented into any other type (e.g., moving pictures) depending on the type of information that can or should be displayed on the image display apparatus 100, and it is to be understood that the objects described in this embodiment do not limit the present invention.

In addition, a widget is an element that enables the user to change specific data in a GUI on his own. For instance, the widget may be one of a sound volume button, a channel button, a menu, an icon, a navigation tab, a scroll bar, a progress bar, a text box, and a window which are displayed on the display 180. The type of a widget implemented in the image display apparatus 100 may vary with the specification of a GUI that can or should be realized in the image display apparatus 100. The widgets of this embodiment should not be construed as limiting the present invention.

Further, the A/V processor 170 processes an A/V signal included in a signal received through the broadcast signal receiver 110, the network interface 120, or the external device I/O portion 130 to be suitable for the display 180. The A/V processor 170 can then process the A/V signal based on information included in a data signal received along with the A/V signal. The A/V processor 170 also processes an A/V signal received through the UI controller 160 such that the A/V signal can be output to the audio output portion 185 or the display 180. The user can also identify the operational status of the image display apparatus 100 or enter a command related to the image display apparatus 100 on the GUI displayed on the display 180 based on the A/V signal generated from the UI controller 160.

In addition, the A/V processor 170 can select an A/V signal to be processed according to a user command received from the controller 150. The A/V signal corresponds to a sound or an image output through the audio output portion 185 or the display 180. Commands received through the controller 150 may also include a broadcast channel selection command, a command to select a content to be played from among contents input to the image display apparatus 100, etc. In this embodiment, the A/V processor 170 processes a video signal such that an externally received two-dimensional (2D) or three-dimensional (3D) video signal can be displayed on the display 180. The A/V processor 170 can also process a video signal such that a UI created by the UI controller 160 can be displayed with the illusion of 3D on the display 180. The A/V processor 170 will be described later in detail with reference to FIG. 4.

Further, the display 180 generates driving signals by converting a video signal, a data signal, and an OSD signal processed in the A/V processor 170 or a video signal and a data signal received from the external device I/O portion 130 to RGB signals. The display 180 may be implemented as a Plasma Display Panel (PDP), a Liquid Crystal Display (LCD), an Organic Light Emitting Diode (OLED), or a flexible display. In an embodiment of the present invention, the display 180 is capable of 3D display.

In more detail, 3D display techniques can be categorized into auto stereoscopic display techniques and binocular stereoscopic display techniques according to how the user perceives 3D images. The auto stereoscopic display techniques realize 3D images in a display without using an auxiliary device. That is, the user can view 3D images on an auto stereoscopic display without using an auxiliary device (e.g., polarized glasses). Further, the auto stereoscopic display techniques include a lenticular type, a parallax barrier type, etc.

The binocular stereoscopic display techniques realize 3D images with use of an auxiliary device. A Head Mounted Display (HMD) type and a glasses type fall within the binocular stereoscopic display techniques. A glasses-type display requires glasses such as polarized glasses, shutter glasses, a spectrum filter, etc.

In addition, the display 180 may also be implemented as a touch screen so that the display 180 can be used not only as an output device but also as an input device. Further, the audio output portion 185 receives an audio signal processed by the A/V processor 170, for example, a stereo signal, a 3.1 channel signal, or a 5.1 channel signal and outputs the audio signal as voice or sound. The audio output portion 185 may also be implemented into various types of speakers.

Figure 4:
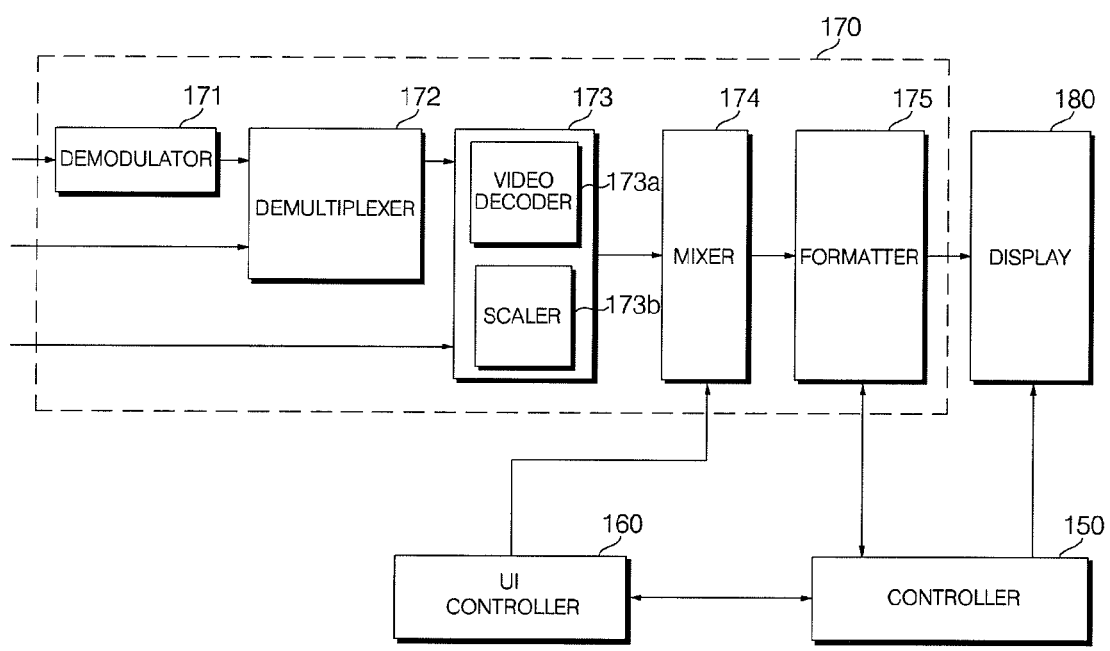

Next, FIG. 4 is a block diagram of the A/V processor 170 in the image display apparatus 100 according to an embodiment of the present invention. As shown, the A/V processor 170 includes a demodulator 171, a demultiplexer 172, a decoder 173, a mixer 174, and a formatter 175. The demodulator 171 demodulates a broadcast signal received from the broadcast signal receiver 110. For example, the demodulator 171 can receive a digital IF signal DIF from the broadcast signal receiver 110 and demodulate the digital IF signal DIF. The demodulator 171 can also perform channel decoding. For the channel decoding process, the demodulator 171 may include a convolutional decoder, a deinterleaver and a Reed-Solomon decoder and perform convolutional decoding, de-interleaving and Reed-Solomon decoding.

The demodulator 171 can also perform demodulation and channel decoding on the digital IF signal received from the broadcast signal receiver 110, thereby obtaining a stream signal TS. In more detail, the stream signal TS is a signal in which a video signal, an audio signal and a data signal are multiplexed. For example, the stream signal TS may be an Moving Picture Experts Group-2 (MPEG-2) Transport Stream (TS) signal obtained by multiplexing an MPEG-2 video signal and a Dolby AC-3 audio signal. The MPEG-2 TS signal may also include a 4-byte header and a 184-byte payload.

In order to properly handle not only ATSC signals but also DVB signals, the demodulator 171 may also include an ATSC demodulator and a DVB demodulator. Further, the demodulator 171 outputs the stream signal TS to the demultiplexer 172. The demultiplexer 172 then demultiplexes the input stream signal TS, for example, an MPEG-2 TS into an audio signal, a video signal, and a data signal. The demultiplexer 172 can also receive the stream signal from the demodulator 171, the network interface 120, or the external device I/O portion 130.

In addition, the data signal obtained by demultiplexing the input stream signal may be an encoded data signal, which can include, for example, Electronic Program Guide (EPG) information that provides broadcasting information such as the start and end times of broadcast programs played on each broadcast channel. For instance, the EPG information may be ATSC-Program and System Information Protocol (TSC-PSIP) information for ATSC, whereas it may be DVB-Service Information (DVB-SI) for DVB.

The decoder 173 can also decode the demultiplexed signals. In this embodiment, the decoder 173 includes a video decoder 173a for decoding the demultiplexed video signal, and a scaler 173b for controlling the resolution of the decoded video signal to a resolution level at which the decoded video signal can be output in the image display apparatus 100. Further, the mixer 174 mixes a video signal input to the image display apparatus 100 from the external device with a video signal generated by the UI controller 160. The display 180 then displays an image based on the mixed video signal.

In addition, the formatter 175 can identify the format of the mixed video signal received from the mixer 174 by referring to a data signal related to the video signal. The formatter 175 then converts the mixed video signal to a format suitable for the display 180 and outputs the converted video signal to the display 180.

Further, in this embodiment, the image display apparatus 100 can display a 3D image on the display 180. In particular, the formatter 175 separates the mixed video signal into multi-viewpoint images and creates a 3D image signal of a predetermined format with the multi-viewpoint images. The formatter 175 also outputs the 3D image signal to the display 180, and the display 180 displays a 3D image based on the 3D image signal.

In addition, a 3D image is formed with multi-viewpoint images. Then, the user views the multi-viewpoint images with his left and right eyes. The disparity between the multi-viewpoint images viewed by the left and right eyes gives the illusion of 3D to the user. The multi-viewpoint images that form the 3D image are a left-eye image perceivable to the left eye and a right-eye image perceivable to the right eye.

Figure 5:
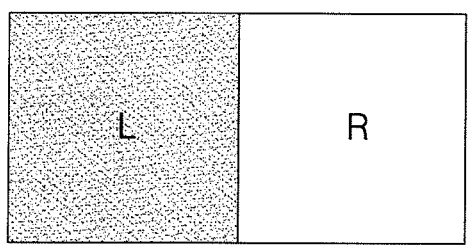
FIG. 5 includes overviews of 3D image formats available to the image display apparatus illustrated in FIGS. 3 and 4.
Figure 5:
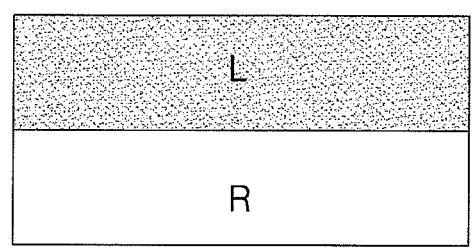
Figure 5:
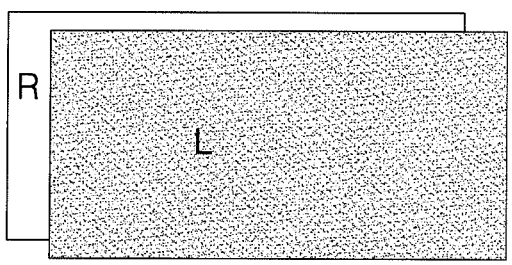
Figure 5:
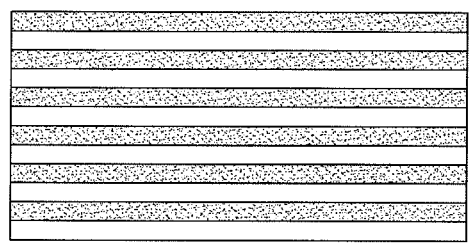
Figure 5:
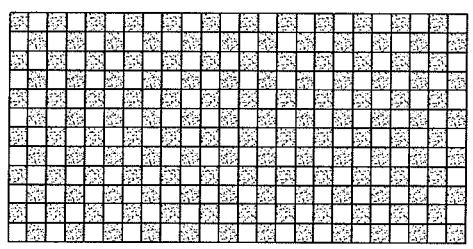

In more detail, FIG. 5 illustrates 3D image formats in which 3D images can be realized. The 3D image formats are classified according to layouts of left-eye and right-eye images generated to form a 3D image. Referring to FIG. 5(a), the left-eye and right-eye images are disposed on the left and right sides, respectively. This is called a side by side format.

Referring to FIG. 5(b), the left-eye and right-eye images are arranged vertically in a top-down format. Referring to FIG. 5(c), a time-division layout of the left-eye and right-eye images is called a frame sequential format. Referring to FIG. 5(d), the left-eye and right-eye images alternate with each other line by line. This is called an interlaced format. Referring to FIG. 5(e), the left-eye and right-eye images are mixed in the form of boxes in a checker box format.

In addition, a video signal included in a signal received from an external device and a GUI video signal created by the UI controller 160 can also be 3D image signals with which 3D images are realized. Further, the mixer 174 mixes these 3D image signals and outputs the mixed 3D image signal to the formatter 175. The formatter 175 can then identify the format of the mixed 3D image signal referring to a related data signal, process the 3D image signal according to the identified format and output the processed 3D image signal to the display 180.

Further, if limited 3D image formats are available to the display 180, the formatter 175 can convert the received 3D image signal to a 3D image format in which the display 180 can display a 3D image and output the converted 3D image signal to the display 180. Also, if the formatter 175 fails to identify the format of the input mixed 3D image signal using the related data signal, the formatter 175 can identify the format of the input mixed 3D image signal by a predetermined algorithm. For example, the format can be identified by analyzing edges of an image generated based on the input 3D image signal. In addition, if the formatter 175 receives a mixed 2D signal for forming a 2D image, the formatter 175 can generate a 3D image signal from the 2D image signal using a 2D-3D conversion algorithm.

Figure 6A:
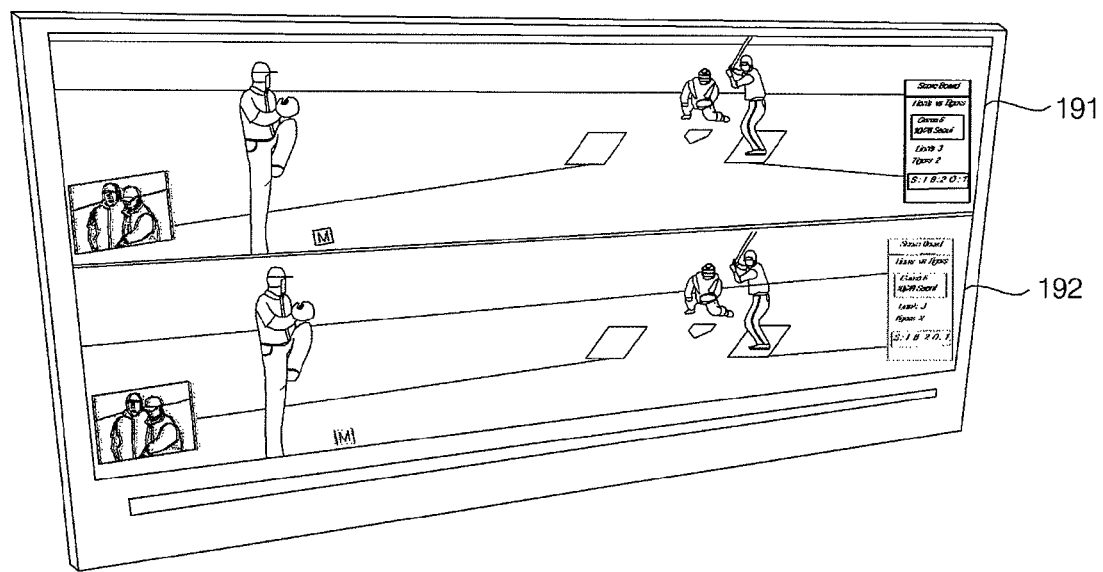
FIGS. 6A, 6B and 6C are diagrams illustrating images displayed in the image display apparatus illustrated in FIG. 3.
Figure 6B:
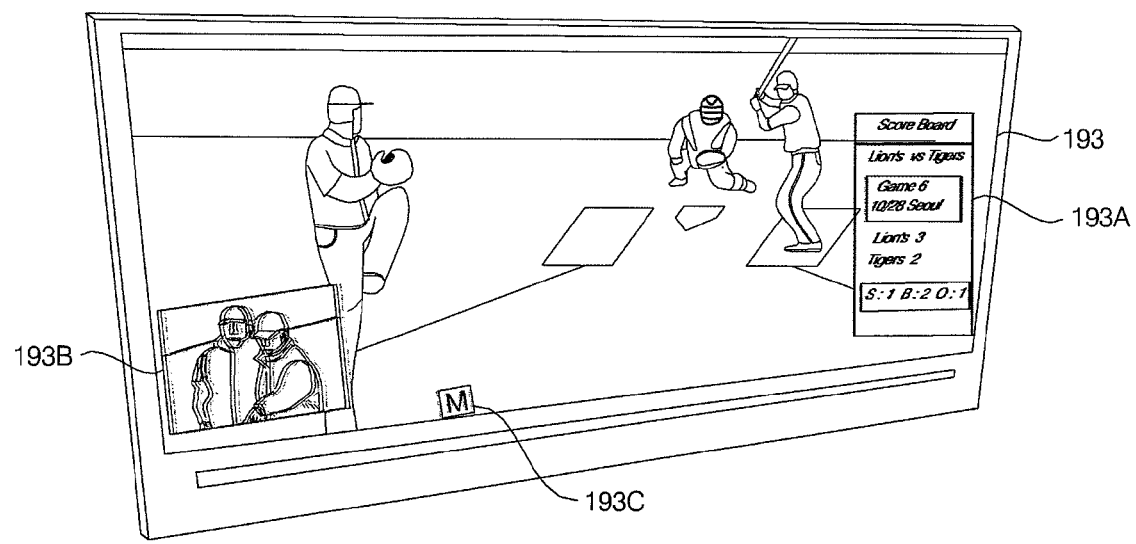
Figure 6C:
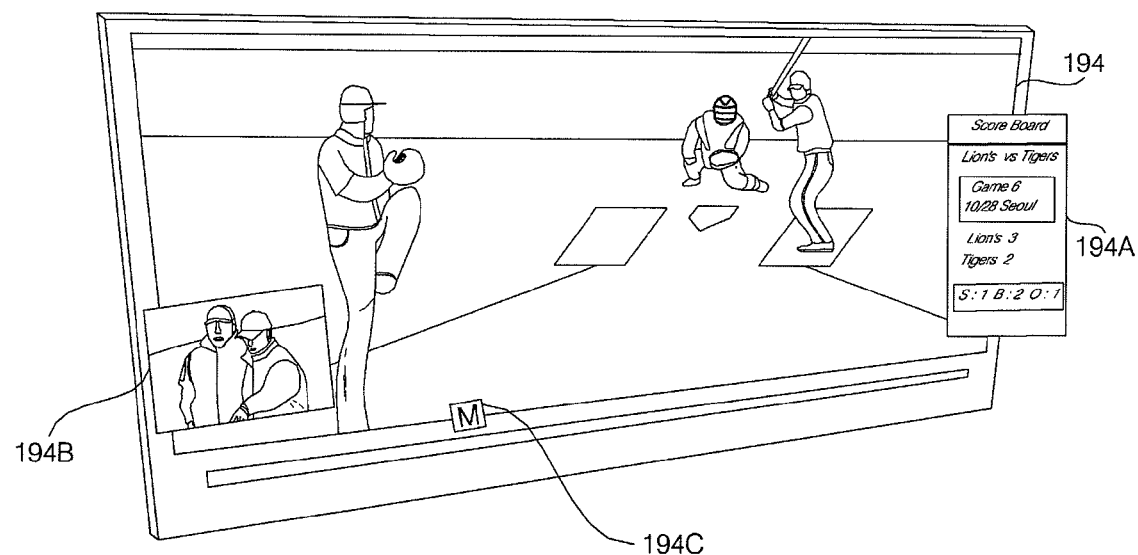

Next, FIGS. 6A, 6B and 6C illustrate images displayed in the image display apparatus 100 illustrated in FIG. 3 according to an embodiment of the present invention. Further, the image display apparatus 100 can display a 3D image in the top-down format among the 3D image formats illustrated in FIG. 5. In particular, FIG. 6A illustrates images displayed on the display 180, when image reproduction is discontinued in the image display apparatus 100. Therefore, since multi-viewpoint images are arranged up and down in the top-down format, the discontinued image reproduction results in displaying separated upper and lower images 191 and 192, as illustrated in FIG. 6A.

When the image display apparatus 100 supports a binocular stereoscopic display scheme, an image displayed on the display 180 looks out of focus to the user unless the user wears 3D glasses such as polarized glasses. Thus, as illustrated in FIG. 6B, 3D objects 193A, 193B and 193C may appear out of focus. If an image 193 displayed on the display 180 is a 3D image, the image 193 may also appear to be out of focus.

FIG. 6C illustrates the user viewing the screen of the image display apparatus illustrated in FIG. 6B with 3D glasses such as polarized glasses. Referring to FIG. 6C, an image 194 and 3D objects 194A, 194B and 194C are in focus on the display 180. The 3D objects 194A, 194B and 194C also appear to be protruding toward the user. Also, if the image display apparatus 100 supports the auto stereoscopic display scheme, the user can view the screen as illustrated in FIG. 6C without the need for wearing 3D glasses such as polarized glasses.

Further, in an embodiment of the present invention, the 3D objects may include images or text that provide information about the image display apparatus 100 or an image displayed on the image display apparatus 100 such as a sound output (volume) level, channel information, current time, etc. For example, a 3D object may be one of a sound volume button, a channel button, a menu, an icon, a navigation tab, a scroll bar, a progress bar, a text box, and a window which are displayed on the display 180. Thus, the user acquire information about the image display apparatus 100 or information about an image displayed on the image display apparatus 100 using these 3D objects. The user can also enter a command to the image display apparatus 100 using an object displayed on the display 180.

In addition, to give a sense of protrusion toward the user, a 3D object is set to a positive depth. Also, a 2D or 3D object that is supposed to look apart from the user by a certain distance is set to a zero depth. Thus, to make a 3D object look more distant from the user than the 2D or 3D object with the zero depth, the 3D object can be given a negative depth. Therefore, because a 3D object is deeper, it looks more protruding toward the user.

Further, in embodiments of the present invention, a 3D object is an object that has been processed to give the illusion of 3D. This 3D object may be realized using multi-viewpoint images, and the depth of the 3D object depends on the disparity between multi-viewpoint images of the 3D object. In this instance, the disparity between multi-viewpoint images of a 3D object generated by the formatter 175 can correspond to the depth of the 3D object. Also, while 3D objects are shown to be Picture-In-Picture (PIP) images in FIG. 6C for illustrative purposes, to which the present invention is not limited, an EPG for providing broadcast program information, various menus of the image display apparatus 100, widgets, icons, etc. may be configured as 3D objects.

Figure 7:
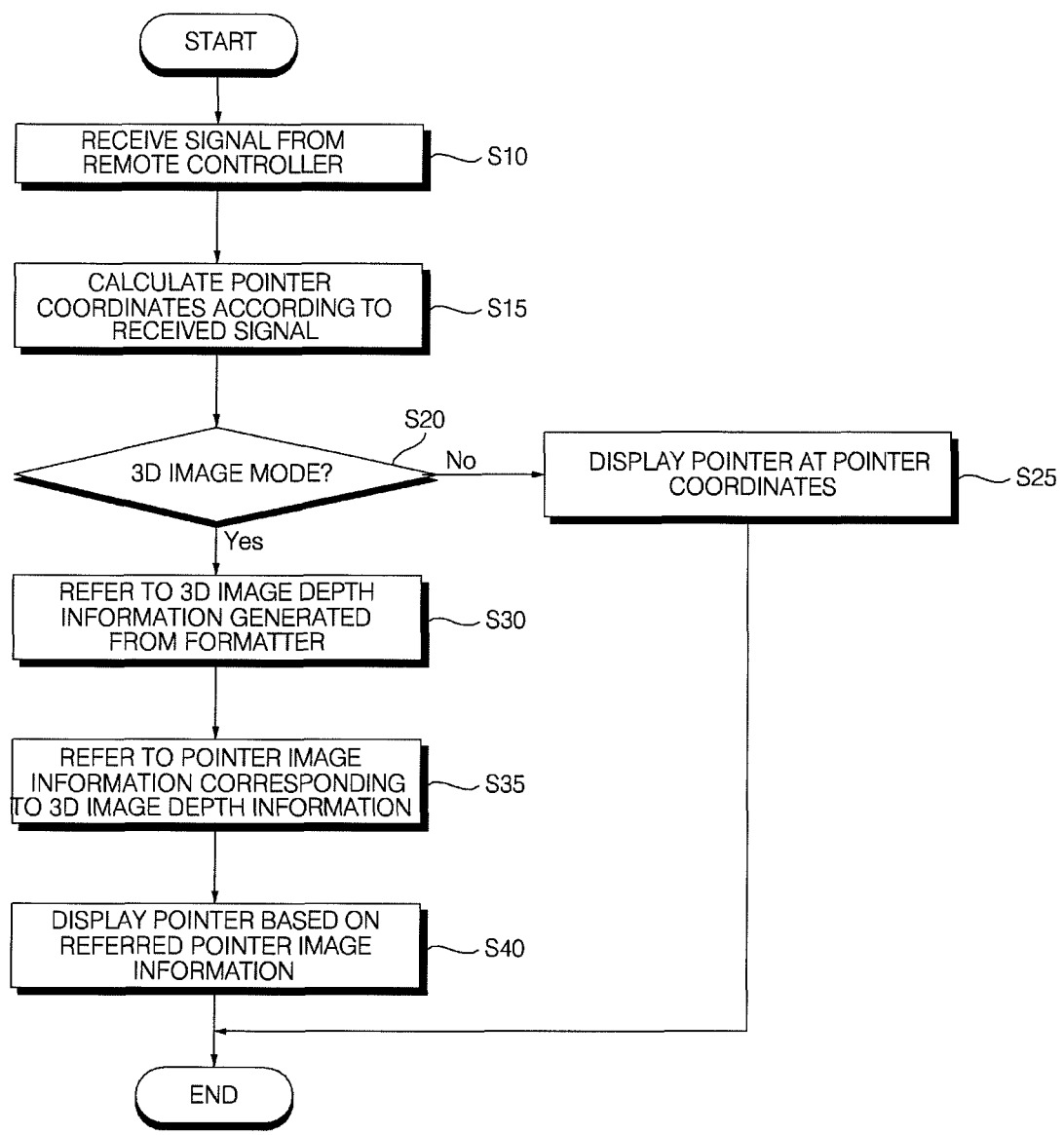
FIG. 7 is a flowchart illustrating a method for operating the image display apparatus illustrated in FIGS. 3 and 4 according to an embodiment of the present invention.

Next, FIG. 7 is a flowchart illustrating a method for operating the image display apparatus 100 according to an embodiment of the present invention. As shown, the image display apparatus 100 receives a signal from the spatial remote controller 200 (S10). The image display apparatus 100 is then controlled according to a command included in the received signal. Further, the image display apparatus 100 can display the pointer 201 on the display 180 based on information included in a signal received from the spatial remote controller 200, and move the pointer 201 according to the signal received from the spatial remote controller 200. For example, the pointer 201 is shifted in correspondence with the movement of the spatial remote controller 200. In another example, the pointer 201 may be shaped in accordance with the type of an image display apparatus-related command received from the spatial remote controller 200.

As discussed above, the image display apparatus 100 can display a 3D image. For example, the image display apparatus 100 can display a 3D object in such a manner that the 3D object appears protruding toward the user. In this embodiment, the image display apparatus 100 also displays the pointer 201 according to the depth of a 3D object included in a 3D image being displayed on the display 180. That is, the depth of the pointer 201 corresponds to the depth of the 3D object. In addition, the brightness, size and/or shape of the pointer 201 can be determined according to the depth of the 3D object. As stated before, the remote controller used in the embodiments of the present invention may be the spatial remote controller 200 illustrated in FIGS. 1A and 1B.

Referring again to FIG. 7, the image display apparatus 100 can receive a signal from the spatial remote controller 200 through the remote controller interface 140 in step S10 in compliance with various radio communication standards including an IR communication standard, an RF communication standard, etc. The remote controller interface 140 also outputs the received signal to the controller 150.

The controller 150 then calculates pointer coordinates representing a target point to which the pointer 201 is to be shifted based on the received signal (S15). Specifically, the controller 150 calculates the pointer coordinates corresponding to the movement of the spatial remote controller 200 using a hand-shaking elimination algorithm. Further, the pointer coordinates indicate the position at which the pointer 201 is supposed to reside on the display 180. Alternatively, the spatial remote controller 200 can calculate the pointer coordinates and transmit a signal carrying information about the calculated pointer coordinates to the image display apparatus 100. Then, the controller 150 can extract the pointer coordinates information from the received signal and determine the pointer coordinates accordingly.

The controller 150 then determines whether a 3D image can be realized in the image display apparatus 100 (S20). Also, the mode of the image display apparatus 100 in which 3D images are configured is referred to as a 3D image mode. If the image display apparatus 100 is not in the 3D image mode (No in S20), the controller 150 displays the pointer 201 at the calculated pointer coordinates (S25). For example, the pointer can be displayed two-dimensionally on the display 180 and thus the 2D pointer 201 has a depth of 0. On the other hand, if the image display apparatus 100 is placed in the 3D image mode (Yes in S20), the controller 150 determines the depth of a current 3D object configured in the image display apparatus 100 (S30). Further, the depth of the 3D object can be determined based on a 3D image signal processed by the formatter 175.

For example, the controller 150 can analyze multi-viewpoint images of a 3D object that the formatter 175 is generating. Specifically, the controller 150 can analyze the disparity between the multi-viewpoint images of the 3D object, for example, the disparity between left-eye and right-eye images of the 3D object, because the depth of the 3D object depends on the disparity between its left-eye and right-eye images.

The controller 150 can also generate depth information about the 3D object based on the analysis and determine the depth of the 3D object being displayed in the image display apparatus 100 based on the depth information. Further, the controller 150 can update the depth information, periodically or whenever a predetermined event occurs. For instance, if an event that triggers a change of the 3D object depth occurs, the controller 150 can update the depth information.

In addition, the controller 150 can output the pointer coordinates information and the depth information to the UI controller 160. The UI controller 160 then generates a pointer image signal corresponding to the received information and outputs the pointer image signal to the mixer 174. The UI controller 160 also refers to pointer image information when generating the pointer image signal (S35). Further, the pointer image information includes information about pointer images having different depths intended for the pointer 201. For example, the depth of the pointer 201 may be determined according to the disparity between the left-eye and right-eye images of a pointer image, particularly the distance between the positions at which the left-eye and right-eye images of the pointer image are displayed. The pointer image information may also include information about left-eye and right-eye images and information about the distances between the left-eye and right-eye images, for the respective depths.

Thus, the UI controller 160 generates the pointer image signal by which the pointer 201 will be displayed at the 3D object depth determined by the controller 150, referring to the pointer image information. In another example, the pointer image information may include information about brightness levels, sizes, or shapes of the pointer 201 for the respective depths. Then, the UI controller 160 can generate the pointer image signal by which the pointer 201 will be displayed in a brightness, size or shape corresponding to the 3D object depth determined by the controller 150.

Next, the formatter 175 generates multi-viewpoint images of the pointer image based on the pointer image signal received from the UI controller 160 and displays the multi-viewpoint images of the pointer image on the display 180 (S40). Also, at least one of the depth, brightness, size, and shape of the pointer 201 displayed on the display 180 may correspond to the depth of the current displayed 3D object.

Figure 8A:
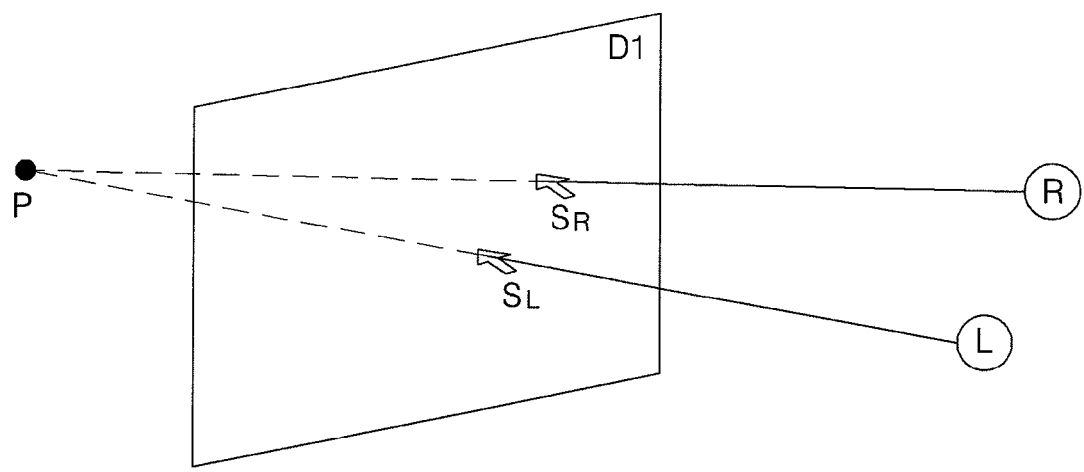
Figure 8B:
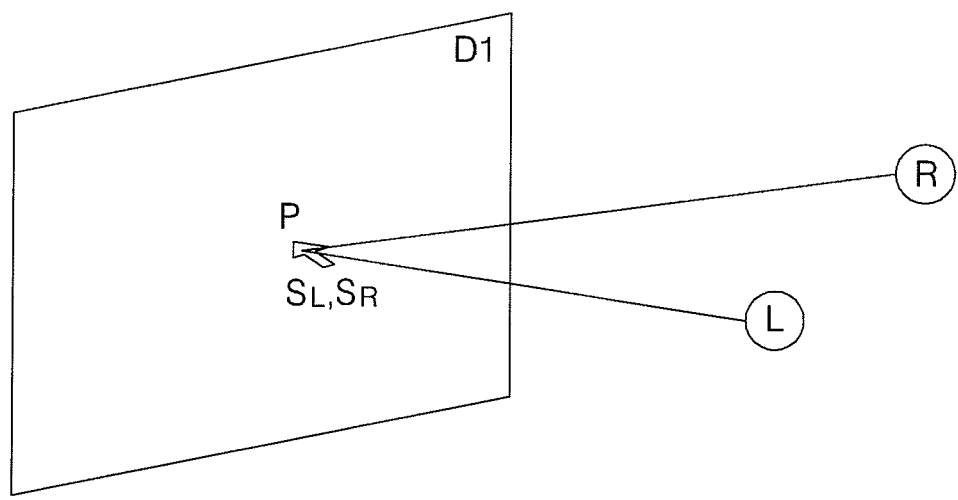
Figure 8C:
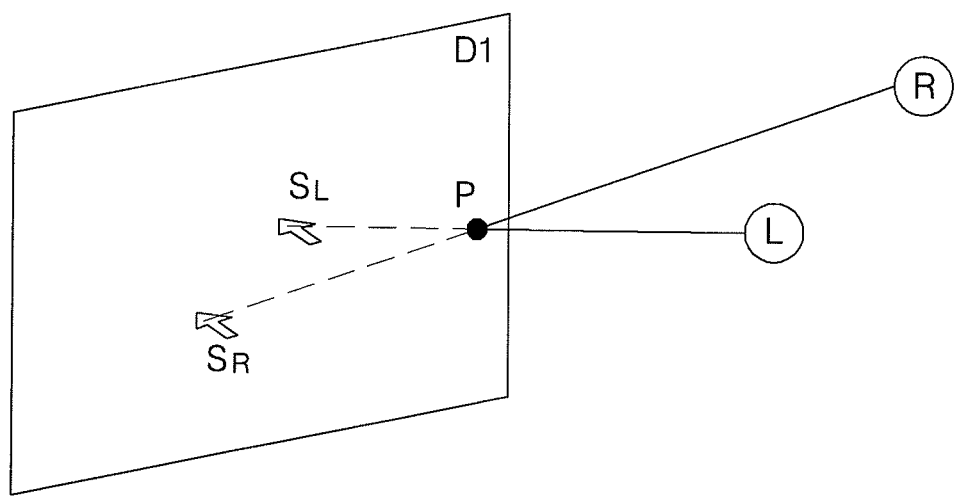

Turning next to FIGS. 8A, 8B and 8C, views referred to for describing the method for operating the image display apparatus 100 illustrated in FIG. 7 are shown. In addition, the image display apparatus 100 can control the depth of the pointer 201 by changing the positions of displaying the multi-viewpoint images of the pointer 201. In one embodiment, the multi-viewpoint images are left-eye and right-eye images.

In more detail, FIG. 8A illustrates the positions of displaying a left-eye image $S_L$ and a right-eye image $S_R$ that form a pointer P on a predetermined display plane D1. The user then views the left-eye image $S_L$ with his left eye L and the right-eye image $S_R$ with his right eye R. Due to the disparity between the displayed positions of the left-eye image $S_L$ and the right-eye image $S_R$, the user perceives the pointer P as if it was positioned behind the display plane D1 on which the left-eye image $S_L$ and the right-eye image $S_R$ are displayed.

Referring to FIG. 8B, the left-eye image $S_L$ and the right-eye image $S_R$ are displayed at the same position. Thus, the user perceives the pointer P as if it was positioned on the display plane D1 on which the left-eye image $S_L$ and the right-eye image $S_R$ are displayed. Referring to FIG. 8C, the left-eye image $S_L$ is displayed on the right side of the right-eye image $S_R$. Thus, the user perceives the pointer P as if it is protruded toward the user from the display plane D1 on which the left-eye image $S_L$ and the right-eye image $S_R$ are displayed.

As noted from FIGS. 8A, 8B and 8C, the UI controller 160 generates the pointer image signal such that the multi-viewpoint images of the pointer can be displayed at positions corresponding to the intended depth of the pointer, and outputs the pointer image signal to the mixer 174. In addition, when the pointer is supposed to appear to be protruding toward the user, the UI controller 160 can generate the pointer image signal so that the pointer is larger or brighter and output the pointer image signal to the mixer 174.

Figure 9:
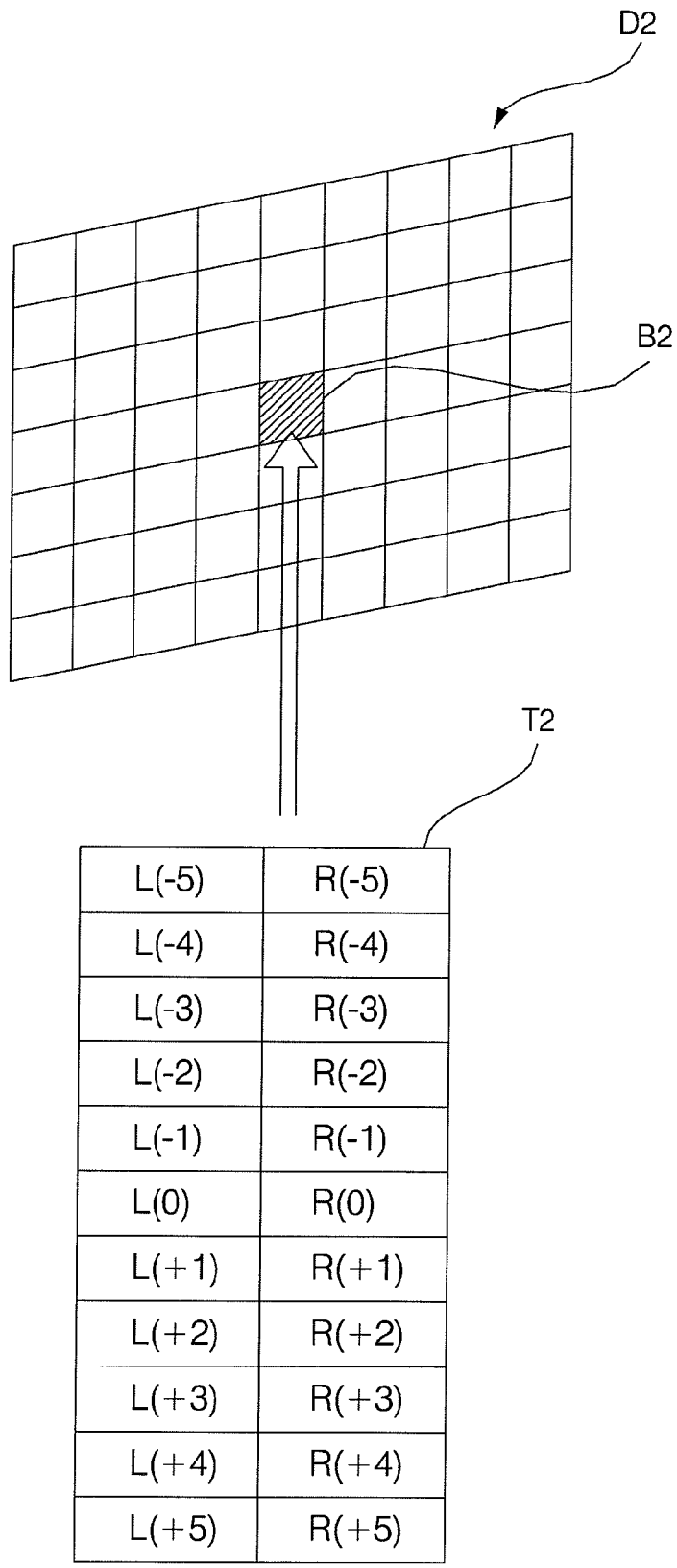

Next, FIG. 9 is a view referred to for describing the method for operating the image display apparatus 100 illustrated in FIG. 7. In more detail, the UI controller 160 can store pointer image information according to positions at which the pointer will be displayed and refer to the pointer image information. As shown in FIG. 7, a predetermined display plane D2 on which multi-viewpoint images of the pointer are displayed can be divided into a plurality of blocks. The UI controller 160 then stores pointer image information on a block-for-block basis.

Further, the UI controller 160 identifies a block in which the pointer is to be displayed using the pointer coordinates information received from the controller 150. The UI controller 160 also calculates a depth with which the pointer is to be displayed based on the 3D object depth determined by the controller 150, and generates a pointer image signal referring to pointer image information corresponding to the pointer depth in a pointer image information look-up table.

Referring again to FIG. 9, the UI controller 160 includes a pointer image information look-up table T2 for each block B2. In one embodiment of the present invention, 11 depth levels are defined for the 3D object and the pointer. At depth levels −5 to −1, the 3D object and the pointer appear to be behind the display plane D2. Also, when the 3D object and the pointer appear to be in front of the display plane D2, they have a depth level of +1 to +5.

Also, in one embodiment of the present invention, the pointer image information look-up table has information about left-eye and right-eye images $S_L$ and $S_R$, particularly information about positions of displaying the left-eye and right-eye images $S_L$ and $S_R$, for each pointer depth. Therefore, when generating a pointer image signal, for example, at a depth level of −5, the UI controller 160 refers to information about left-eye and right-eye images corresponding to the depth level of −5.

Further, the pointer image information look-up table can store information about left-eye and right-eye images $S_L$ and $S_R$, particularly information about the brightness level, size or shape of the left-eye and right-eye images $S_L$ and $S_R$, for each pointer depth. Therefore, when generating a pointer image signal, for example, at a depth level of −5, the UI controller 160 refers to information about left-eye and right-eye images corresponding to the depth level of −5, to thereby determine the brightness, size or shape of the pointer.

Figure 10:
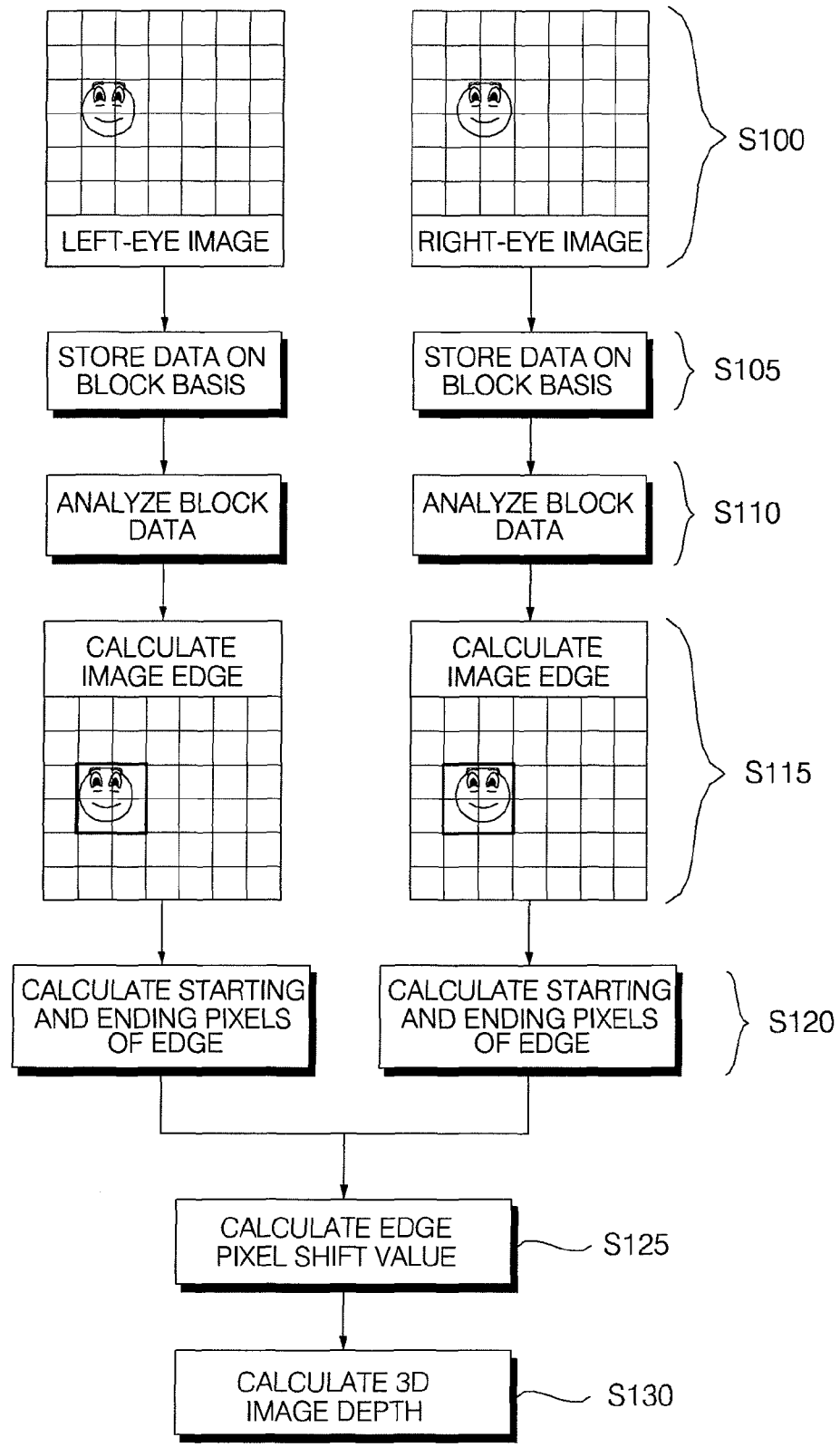

Next, FIG. 10 is a view referred to for describing the method for operating the image display apparatus, illustrated in FIG. 7. In more detail, the controller 150 can calculate the depth of the 3D object based on the disparity between the multi-viewpoint images of the 3D object, particularly the distance between the positions of displaying the multi-viewpoint images of the 3D object, generated by the formatter 175, and store the 3D object depth information.

Upon generation of an event that triggers displaying of the pointer, the controller 150 determines the depth of a current displayed 3D object referring to the stored 3D object depth information. Alternatively, upon generation of an event triggering displaying of a pointer, the controller 150 can calculate the 3D object depth information and refer to the 3D object depth information. The controller 150 can notify the UI controller 160 of the 3D object depth.

Referring again to FIG. 10, to realize a 3D image, the left-eye and right-eye images of the 3D image are displayed on the display 180 (S100). The controller 150 then stores image data of the left-eye and right-eye images on a block basis (S105) and analyzes the stored image data (S110). In one embodiment, the controller 150 calculates edges of the left-eye and right-eye images displayed in specific blocks (S115) and detects the starting and ending pixels of the calculated edges (S120). The controller 150 also calculates the differences between the edge starting pixels and between the edge ending pixels of the left-eye and right-eye images. That is, the controller 150 calculates an edge shift value between the left-eye and right-eye images (S125). The controller 150 then calculates the depth of the current displayed 3D object, particularly the 3D object whose edges have been detected (S130).

Next, FIG. 11 is a table listing 3D object depths for calculated shift values. Thus, the controller 150 can obtain the depth information of the 3D object according to the shift value between the edge starting and ending pixels of the left-eye and right-eye images and the shift direction between the left-eye and right-eye images referring to the table.

Figure 12A:
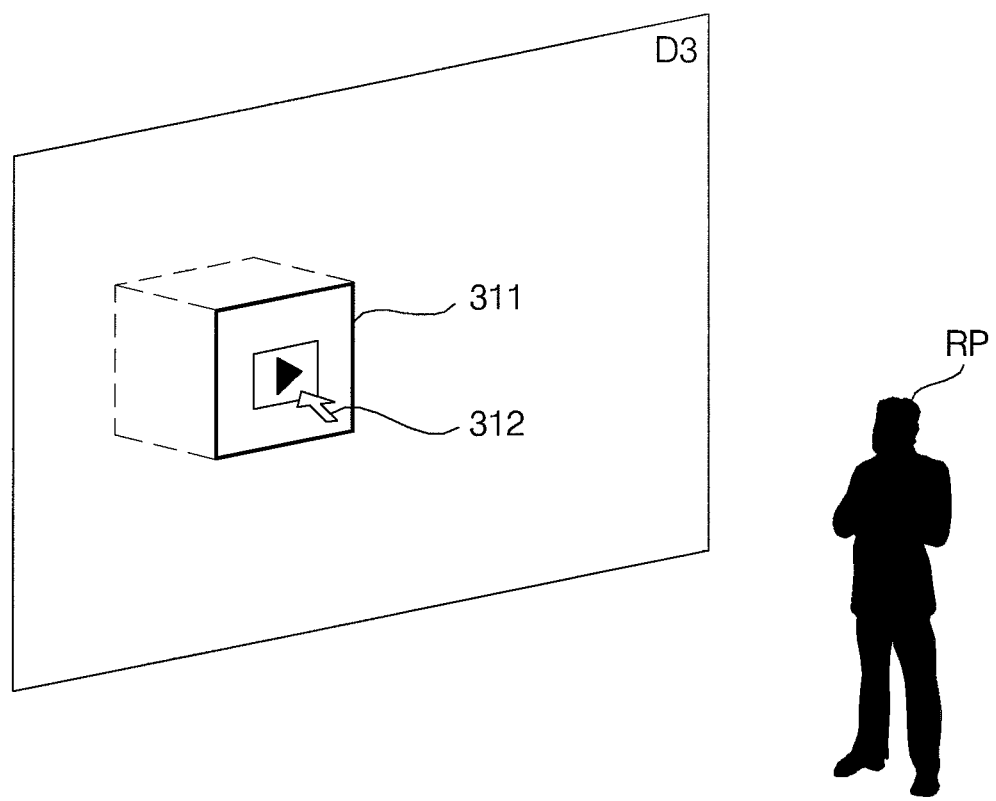
Figure 12B:
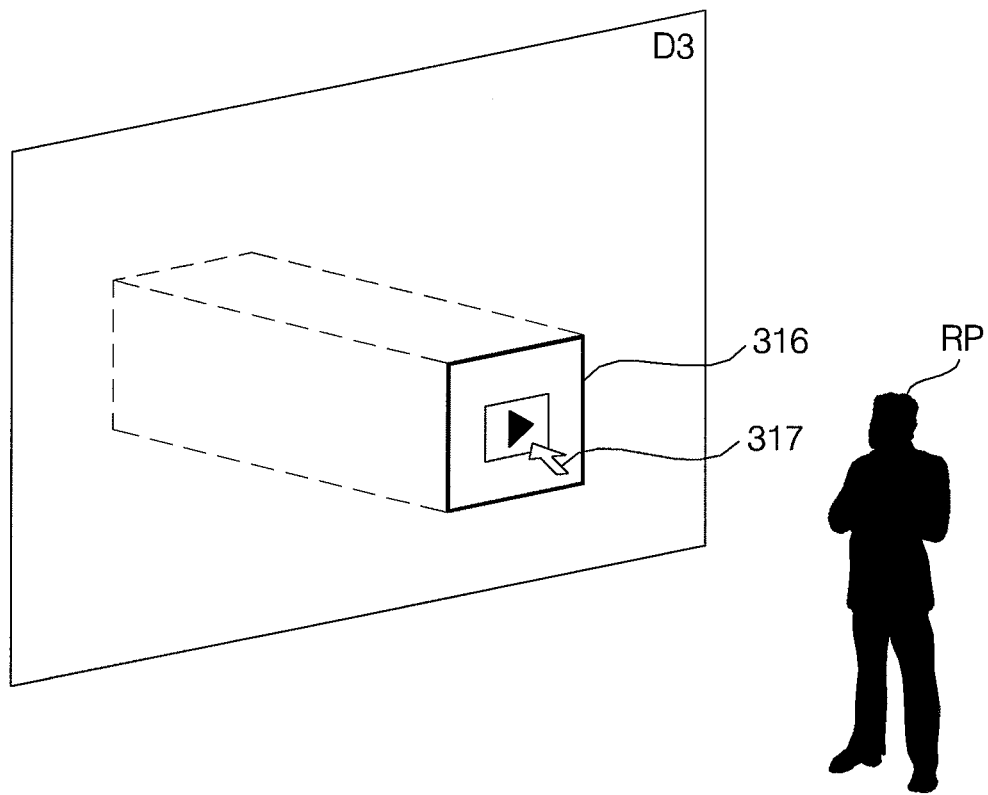

FIGS. 12A and 12B are views referred to for describing the method for operating the image display apparatus, illustrated in FIG. 7. In one embodiment, the image display apparatus 100 can display a 3D object and a pointer as if they are protruded toward a specific Reference Point (RP) or a user. Referring to FIG. 12A, multi-viewpoint images of a 3D object 311 and multi-viewpoint images of a pointer 312 are displayed with the same sense of depth on a predetermined display plane D3 appearing to protrude toward the RP.

Further, the pointer 312 moves in correspondence with the movement of the spatial remote controller 200, and is displayed at pointer coordinates calculated based on a signal received from the spatial remote controller 200. Meanwhile, the depth of the pointer 312 corresponds to the depth of the 3D object 311 being displayed in the image display apparatus 100. Referring to FIG. 12B, if a 3D object 316 is displayed such that it appears more protruding toward the user or the RP, the depth of a pointer 317 at the same pointer coordinates is changed in correspondence with the depth of the 3D object 316.

Figure 13:
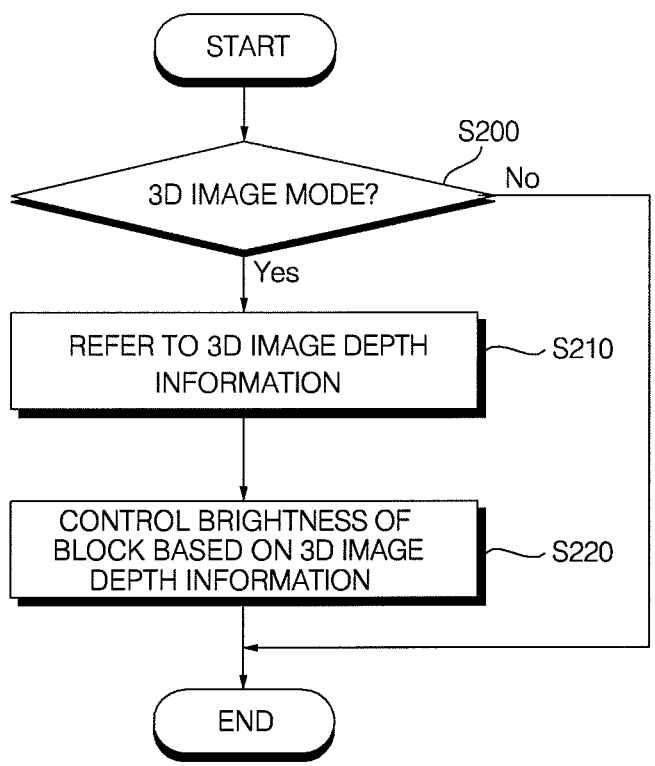
FIG. 13 is a flowchart illustrating a method for operating the image display apparatus illustrated in FIG. 7.

Next, FIG. 13 is a flowchart illustrating a method for operating the image display apparatus illustrated in FIG. 7 according to another embodiment of the present invention. In this embodiment, the controller 150 refers to the depth information of a 3D image and controls the brightness of the display 180 according to the depth information. The controller 150 can also selectively control the brightness of an area in which the 3D image is displayed on the display 180. Accordingly, the brightness of a 3D object or a pointer can be changed according to the depth information. Also, when the controller 150 controls the brightness of the display 180 directly, this obviates the need for re-processing the image signals of the 3D object and the pointer to change the brightness of the 3D object or the pointer.

Referring to FIG. 13, the controller 150 determines whether the image display apparatus 100 is in a 3D image mode (S200). In the 3D image mode (Yes in S200), the controller 150 refers to the depth information of a 3D image (S210). The depth information of the 3D image can be obtained from the disparity of multi-viewpoint images of the 3D image. Then, the controller 150 controls the brightness of a specific area having the multi-viewpoint images of the 3D object displayed therein on the display 180 in accordance with the depth information (S220). Further, if the display 180 is an LCD using LEDs as backlights, the controller 150 can control the brightness of the specific area by controlling backlight LEDs of the specific area.

Figure 14A:
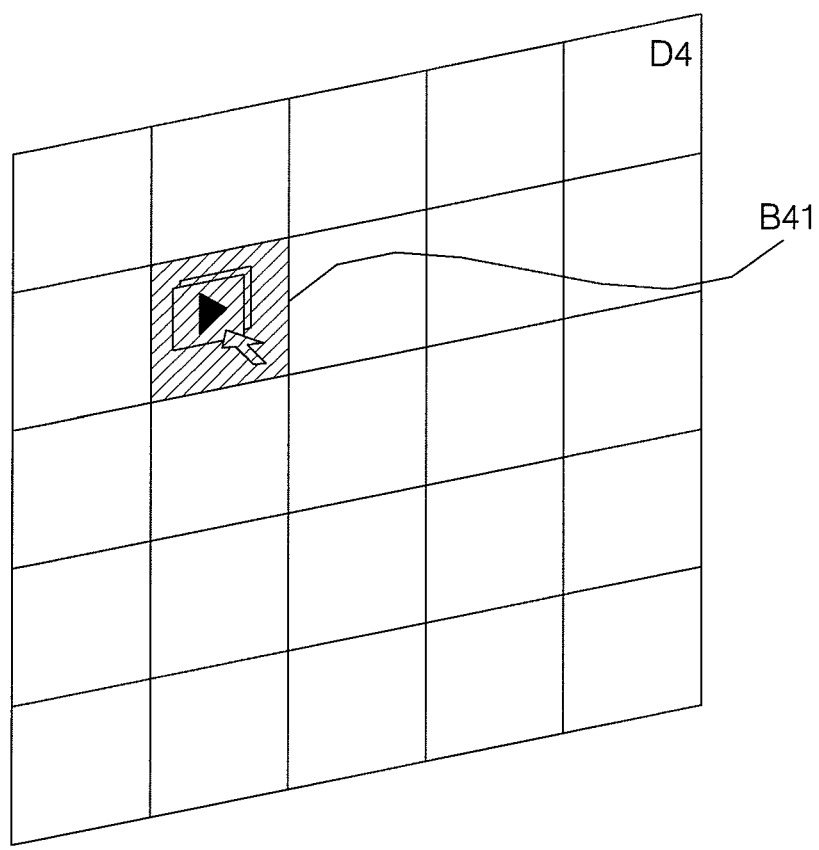
FIGS. 14A to 15B are overviews referred to for describing the image display apparatus illustrated in FIGS. 3 and 4.

Next, FIGS. 14A to 15B are views referred to for describing the method for operating the image display apparatus, illustrated in FIG. 7 according to an embodiment of the present invention. Referring to FIGS. 14A and 14B, multi-viewpoint images of a 3D image can be displayed in a specific block B41 or B42 on a predetermined display plane D4. If the multi-viewpoint images are left-eye and right-eye images, the disparity between the left-eye and right-eye images determines the depth of the 3D image. Further, the disparity between the multi-viewpoint images displayed in the block B41 illustrated in FIG. 14A is smaller than the disparity between the multi-viewpoint images displayed in the block B42 illustrated in FIG. 14B.

Figure 14B:
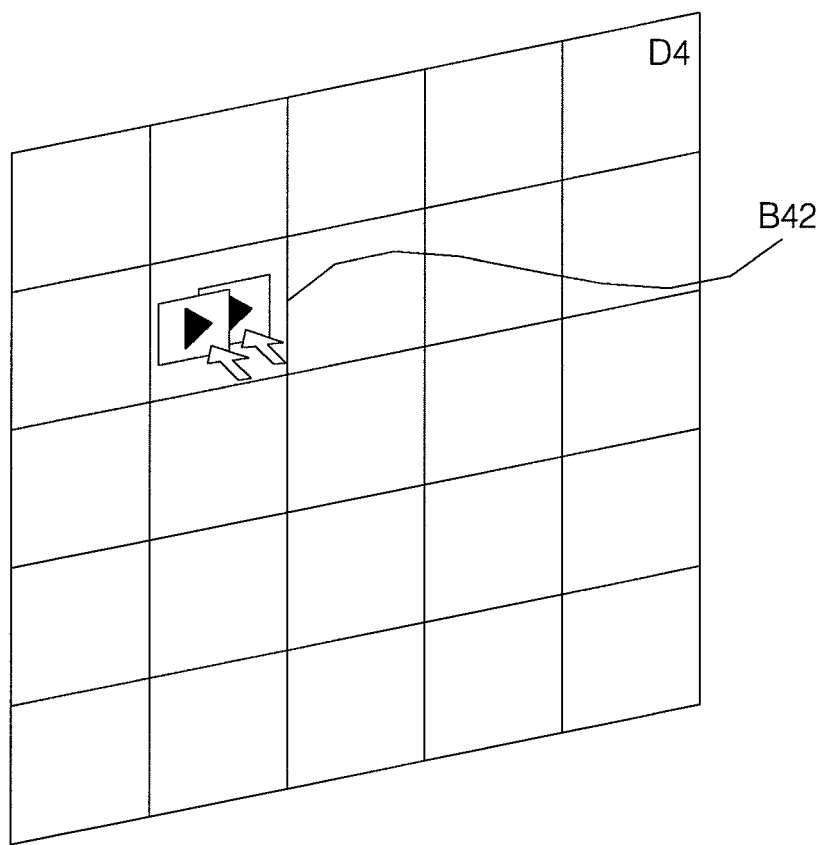

As a result, the 3D image to which the left-eye and right-eye images of FIG. 14A are combined is perceived nearer to the display plane D4 than the 3D image to which the left-eye and right-eye images of FIG. 14B are combined. In addition, the controller 150 can determine the depth of a 3D image by analyzing the disparity between multi-viewpoint images of the 3D image and control the brightness of an area in which the multi-viewpoint images are displayed according to the depth. Therefore, the controller 150 can control the brightness of the display 180 so that the block B42 illustrated in FIG. 14B is brighter than the block B41 illustrated in FIG. 14A.

Figure 15A:
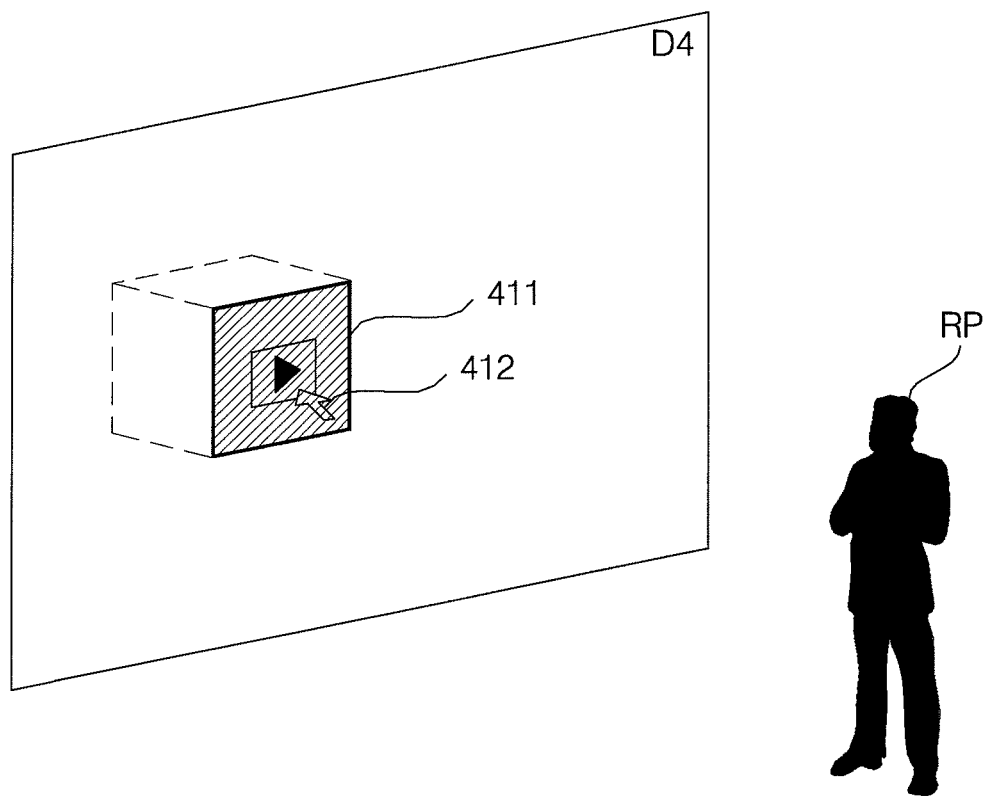
Figure 15B:
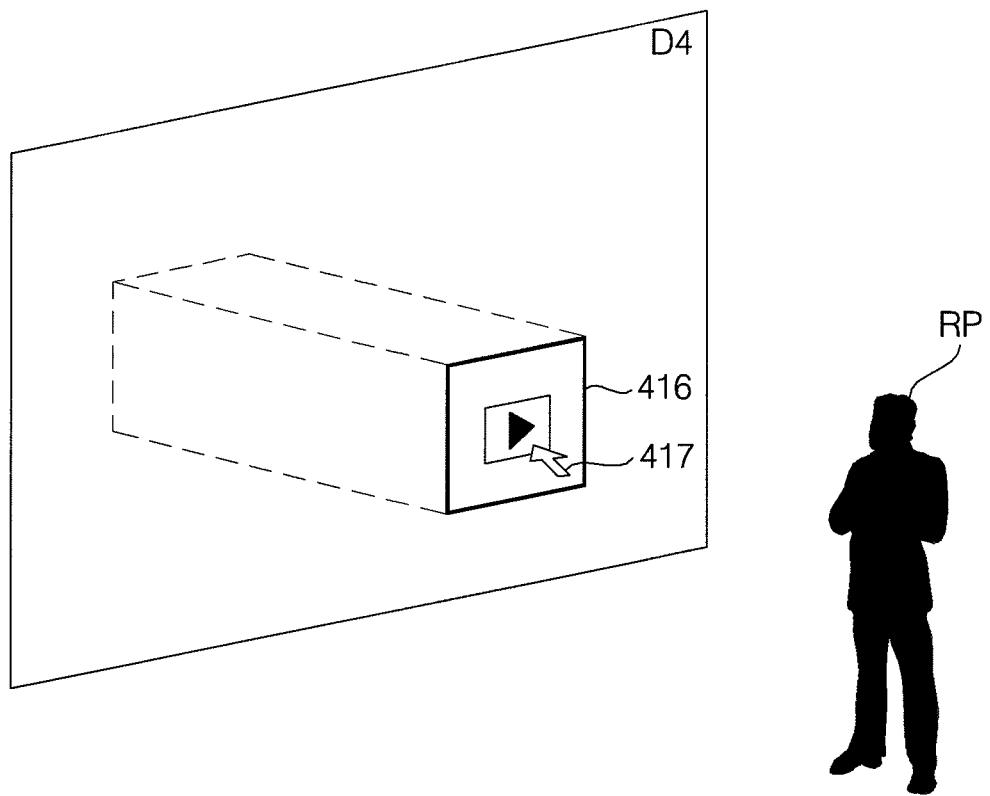

In addition, FIGS. 15A and 15B illustrate 3D images formed with the multi-viewpoint images illustrated in FIGS. 14A and 14B, respectively. Also, for a binocular stereoscopic image display apparatus, when the user wears an auxiliary device such as polarized glasses, 3D objects 411 and 416 and pointers 412 and 417 appear to protrude to the user as illustrated in FIGS. 15A and 15B. Further, the 3D object 411 and the pointer 412 illustrated in FIG. 15A look nearer to the display plan D4 than the 3D object 416 and the pointer 417 illustrated in FIG. 15B. Also, the 3D object 411 and the pointer 412 illustrated in FIG. 15A are less bright than the display plan D4 than the 3D object 416 and the pointer 417 illustrated in FIG. 15B.

Further, in another embodiment, the image display apparatus includes a backlight unit with a plurality of Light Emitting Diodes (LEDs), in which blocks of the plurality of LEDs are independently driven. Further, the method further comprises controlling a brightness of a corresponding block of the LEDs arranged at the calculated position of the pointer are controlled.

In addition, the image display apparatus and the method for operating or controlling the image display apparatus according to the foregoing embodiments are not restricted to the embodiments set forth herein. Therefore, variations and combinations of the exemplary embodiments set forth herein may fall within the scope of the present invention. Further, the operation or control method of the image display apparatus according to the foregoing embodiments may be implemented as code that can be written on a computer-readable recording medium and can thus be read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and Internet transmission. The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

According to one or more of the aforementioned embodiments, an image display apparatus can display a 3D object in such a manner that the 3D object appears protruding toward a user. Also, the image display apparatus can display a pointer that moves in accordance with a signal transmitted by a remote controller at the same depth level as a 3D object being displayed in the image display apparatus. The user can also select the 3D object displayed on the image display apparatus or enter a command related to the 3D object to the image display apparatus.

One or more embodiments described herein provide an image display apparatus and a method for controlling the image display apparatus, which can display a 3D object with a sense of depth so that the 3D object appears protruding toward a user. Also, one or more embodiments described herein also provide an image display apparatus and a method for operating the image display apparatus, which can display a pointer that moves in correspondence with a signal transmitted by a remote controller at the same depth level as a 3D object.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus, comprising:
   a remote controller configured to:
   transmit a signal carrying motion information regarding the remote controller;
   receive signals from a paired image display apparatus in a predetermined frequency band; and
   store information regarding the frequency band;
   a remote control interface configured to receive a power on command in an IR communication from a remote controller and receive a signal carrying motion information regarding the movement of the remote controller in an RF communication from the remote controller;
   a controller configured to:
   calculate a first pointer position at which a pointer is to be displayed on a display of the image display apparatus based on the received signal;
   determine whether the image display apparatus is in a 3D image mode in which a 3D image is displayed;
   display a plurality of objects on the display of the image display apparatus, each object having a different depth;
   determine a depth of a first object of the plurality of three-dimensional (3D) objects displayed on the display of the image display apparatus and pointed at by the remote controller, when the image display apparatus is in the 3D image mode; and
   calculate a second position of the pointer which is to be displayed in the 3D image mode at the determined depth of the first 3D object; and
   a video processor configured to display the pointer at the calculated first pointer position when the image display apparatus is in a 2D image mode and to display the pointer at the calculated second pointer position on the display of the image display apparatus,
   wherein the second position is calculated based on the determined depth of the first 3D object and the first pointer position.

2. The image display apparatus of claim 1, wherein the controller is further configured to display a size of the pointer to be larger as the pointer is displayed at a depth closer to a viewer and smaller as the pointer is displayed at a depth farther from the viewer.

3. The image display apparatus of claim 1, wherein the controller is further configured to determine the depth of the first 3D object by calculating a distance between multi-viewpoint images of the first 3D object, and calculating the depth of the first 3D object based on the distance between the multi-viewpoint images.

4. The image display apparatus of claim 1, wherein the video processor is further configured to display multi-viewpoint images of the pointer on the display such that the displayed multi-viewpoint images make the displayed pointer appear as a 3D pointer.

5. The image display apparatus of claim 4, further comprising:
   a memory configured to store multi-viewpoint images information for a plurality of pointer depths, said multi-viewpoint image information including images of the pointer at each of the plurality of pointer depths,
   wherein the video processor is further configured to display read corresponding multi-viewpoint images for the determined depth of the first 3D object among the multi-viewpoint images stored for each pointer depth, and display the read corresponding multi-viewpoint images of the pointer on the display.

6. The image display apparatus of claim 1, wherein the controller is further configured to update the depth of the first 3D object when an event that triggers a change of the depth of the first 3D object occurs.

7. The image display apparatus of claim 1, wherein the remote control interface is further configured to receive a channel switching command, or a sound volume change command in an IR communication from the remote controller, and wherein the controller is further configured to change a broadcast channel according to the channel switching command or change a sound volume of the image display apparatus according to the sound volume change command.

8. The image display apparatus of claim 1, wherein the controller is further configured to:

control a brightness of the display according to the determined depth of the first 3D object; and display a brightness of the pointer to be brighter as the pointer is displayed at a depth closer to a viewer and less bright as the pointer is displayed at a depth farther from the viewer.

9. The image display apparatus of claim 1, wherein the remote controller comprises:

an IR module configured to transmit the power on command in the IR communication to the remote control interface;

a gyro sensor configured to sense the movement of the remote controller;

an acceleration sensor configured to sense a moving speed of the remote controller; and an RF module configured to transmit the signal carrying motion information regarding the movement of the remote controller in the RF communication to the remote control interface.

* * * * *